United States Patent
Ziaylek

(10) Patent No.: US 11,623,578 B2
(45) Date of Patent: Apr. 11, 2023

(54) SYSTEMS FOR STORING AND RETRIEVING LADDERS AND OTHER OBJECTS

(71) Applicant: Michael P. Ziaylek, Yardley, PA (US)

(72) Inventor: Michael P. Ziaylek, Yardley, PA (US)

(73) Assignee: Michael P. Ziaylek, Yardley, PA (US)

( * ) Notice: Subject to any disclaimer, the term of this patent is extended or adjusted under 35 U.S.C. 154(b) by 385 days.

(21) Appl. No.: 16/886,302

(22) Filed: May 28, 2020

(65) Prior Publication Data

US 2020/0290519 A1    Sep. 17, 2020

Related U.S. Application Data

(63) Continuation-in-part of application No. 15/961,403, filed on Apr. 24, 2018, now Pat. No. 10,689,906.

(51) Int. Cl.
| | | |
|---|---|---|
| *B60R 9/042* | (2006.01) | |
| *E06C 5/24* | (2006.01) | |
| *F16M 13/02* | (2006.01) | |

(52) U.S. Cl.
CPC .......... *B60R 9/042* (2013.01); *F16M 13/022* (2013.01); *B60R 9/0423* (2013.01); *E06C 5/24* (2013.01)

(58) Field of Classification Search
CPC .......... B60R 9/042; B60R 9/0423; E06C 5/24
See application file for complete search history.

(56) References Cited

U.S. PATENT DOCUMENTS

| | | |
|---|---|---|
| 1,890,940 A | 12/1932 | Fox |
| 1,898,826 A | 2/1933 | Fox |
| 1,899,742 A | 2/1933 | Bay |
| 2,005,990 A | 6/1935 | Darley |
| 2,116,470 A | 5/1938 | Kiley et al. |
| 2,586,531 A | 2/1952 | Gordon |
| 2,946,397 A | 7/1960 | Berberich |
| 3,013,681 A | 12/1961 | Garnett |
| 3,058,607 A | 10/1962 | Kiley |
| 3,563,342 A | 2/1971 | Lasiter |
| 3,621,935 A | 11/1971 | Bode |
| 3,672,549 A | 6/1972 | Chorey |
| 4,058,243 A | 11/1977 | Tappan |
| 4,059,281 A | 11/1977 | Evans |
| 4,062,464 A | 12/1977 | Grove |

(Continued)

OTHER PUBLICATIONS

Product information sheet for AS Powerbeam Gantry, retrieved from website http://www.supplyplus.com/p/15/as-fire-and-safety-powerbeam-gantry.

(Continued)

*Primary Examiner* — Brian D Nash
(74) *Attorney, Agent, or Firm* — Fox Rothschild LLP

(57) ABSTRACT

Systems are provided for storing and retrieving objects such as ladders. The systems can include a carriage, and a trolley mounted on the carriage for holding the object and moving the object linearly in relation to the carriage, so that the object can be stowed in locations such as on the roof of a fire engine or other emergency vehicle, or the roof of a stationary structure. The systems can further include a handle assembly that permits a user to move the trolley while the user is standing on the ground. The handle system is configured to secure the trolley in a stowed position, and allows the user to release the carriage from its stowed position.

23 Claims, 24 Drawing Sheets

(56) References Cited

U.S. PATENT DOCUMENTS

| | | |
|---|---|---|
| 4,139,078 A | 2/1979 | Keller |
| 4,161,997 A | 7/1979 | Norman |
| 4,170,331 A | 10/1979 | Faulstich |
| 4,234,285 A | 11/1980 | Martinez |
| 4,239,438 A | 12/1980 | Everson |
| 4,344,508 A | 8/1982 | Peck |
| 4,408,680 A | 10/1983 | Ross |
| 4,603,908 A | 8/1986 | Weaver |
| 4,618,083 A | 10/1986 | Weger, Jr. |
| 4,738,582 A | 4/1988 | Roberts |
| 4,751,981 A | 6/1988 | Mitchell et al. |
| 4,827,742 A | 5/1989 | McDonald |
| 4,858,725 A | 8/1989 | Griffin |
| 4,877,108 A | 10/1989 | Griffin et al. |
| 4,909,352 A | 3/1990 | McComb |
| 4,953,757 A | 9/1990 | Stevens et al. |
| 5,009,350 A | 4/1991 | Schill et al. |
| 5,048,641 A | 9/1991 | Holcomb et al. |
| 5,064,022 A | 11/1991 | Graham |
| 5,071,308 A | 12/1991 | Tibbet |
| 5,104,280 A | 4/1992 | Ziaylek et al. |
| D331,030 S | 11/1992 | Ziaylek et al. |
| 5,172,952 A | 12/1992 | Lasnetski |
| 5,297,912 A | 3/1994 | Levi |
| 5,421,495 A | 6/1995 | Bubik et al. |
| 5,447,408 A | 9/1995 | Smith |
| 5,469,933 A | 11/1995 | Thomason |
| 5,518,357 A | 5/1996 | Ziaylek |
| 5,538,100 A | 7/1996 | Hedley |
| 5,632,591 A | 5/1997 | Henriquez |
| 5,743,702 A | 4/1998 | Gunderson |
| 5,791,857 A | 8/1998 | Ziaylek, Jr. et al. |
| 5,850,891 A | 12/1998 | Olms et al. |
| 6,003,633 A | 12/1999 | Rolson |
| 6,012,545 A | 1/2000 | Faleide |
| 6,029,750 A | 2/2000 | Carrier |
| 6,092,972 A | 7/2000 | Levi |
| 6,257,534 B1 | 7/2001 | Finley |
| 6,315,181 B1 | 11/2001 | Bradley et al. |
| 6,360,930 B1 * | 3/2002 | Flickenger ............ B60R 9/0423 224/310 |
| 6,378,654 B1 | 4/2002 | Ziaylek, Jr. et al. |
| 6,427,889 B1 | 8/2002 | Levi |
| 6,827,541 B1 | 12/2004 | Ziaylek et al. |
| 6,832,667 B1 | 12/2004 | Kahre et al. |
| 7,137,479 B2 | 11/2006 | Ziaylek et al. |
| D545,263 S | 6/2007 | Ziaylek et al. |
| 7,992,682 B2 | 8/2011 | Ziaylek |
| 8,297,635 B2 | 10/2012 | Agoncillo et al. |
| 8,985,933 B2 | 3/2015 | Ziaylek et al. |
| D729,142 S | 5/2015 | Ziaylek et al. |
| 9,194,180 B2 | 11/2015 | Hedley |
| 9,526,932 B1 | 12/2016 | Ziaylek et al. |
| 10,189,417 B1 * | 1/2019 | Morken ................ B60R 9/042 |
| 10,286,853 B1 * | 5/2019 | Carbone ................ G05D 3/10 |
| 10,501,022 B1 * | 12/2019 | Levi ...................... B60R 9/0423 |
| 2002/0090285 A1 * | 7/2002 | Levi ........................ E06C 5/00 224/310 |
| 2004/0052622 A1 | 3/2004 | Chisnall |
| 2006/0076189 A1 * | 4/2006 | Ziaylek ................ B60R 9/0423 182/127 |
| 2006/0185933 A1 * | 8/2006 | Thibault ................ E06C 5/02 182/127 |
| 2009/0145940 A1 * | 6/2009 | Bukowiec ............. B60R 9/042 224/310 |
| 2011/0148057 A1 | 6/2011 | Barrott |
| 2012/0263561 A1 | 10/2012 | Li |
| 2013/0062378 A1 * | 3/2013 | Hobbs ..................... B60R 9/06 224/310 |
| 2013/0181091 A1 | 7/2013 | Evans et al. |
| 2013/0315693 A1 * | 11/2013 | Diverdi ................... B60P 3/40 414/800 |
| 2013/0322997 A1 * | 12/2013 | Ziaylek .................. E06C 5/24 414/556 |
| 2016/0221510 A1 | 8/2016 | Petersen |
| 2017/0232904 A1 * | 8/2017 | Bharucha ............. B60R 9/0485 224/310 |
| 2018/0244208 A1 * | 8/2018 | Willis .................. B60R 9/0423 |
| 2018/0257577 A1 * | 9/2018 | Livingston ............ B60R 9/0485 |
| 2018/0345871 A1 * | 12/2018 | Levi ...................... A62C 33/04 |
| 2019/0126838 A1 * | 5/2019 | Harrell .................. B60R 9/042 |
| 2019/0248295 A1 * | 8/2019 | Müller .................. B60R 9/0423 |
| 2020/0108779 A1 * | 4/2020 | Bharucha ................ B60P 7/135 |
| 2020/0172017 A1 * | 6/2020 | Herriman ............ B60R 9/0485 |
| 2021/0053502 A1 * | 2/2021 | Cote ........................ B60R 9/02 |
| 2021/0061181 A1 * | 3/2021 | Bica .................... B60R 16/0207 |
| 2022/0176883 A1 * | 6/2022 | Pilkington ............. B60R 9/042 |

OTHER PUBLICATIONS

Product information sheet for AS Beam Gantry Retro-Kit, retrieved from website http://www.supplyplus.com/p/17/as-fire-safety-gantry-retro-kit.

Product information sheet for AS Beam Gantries, retrieved from website http://www.supplyplus.com/p/10/as-fire-salety-beam-gantries.

* cited by examiner

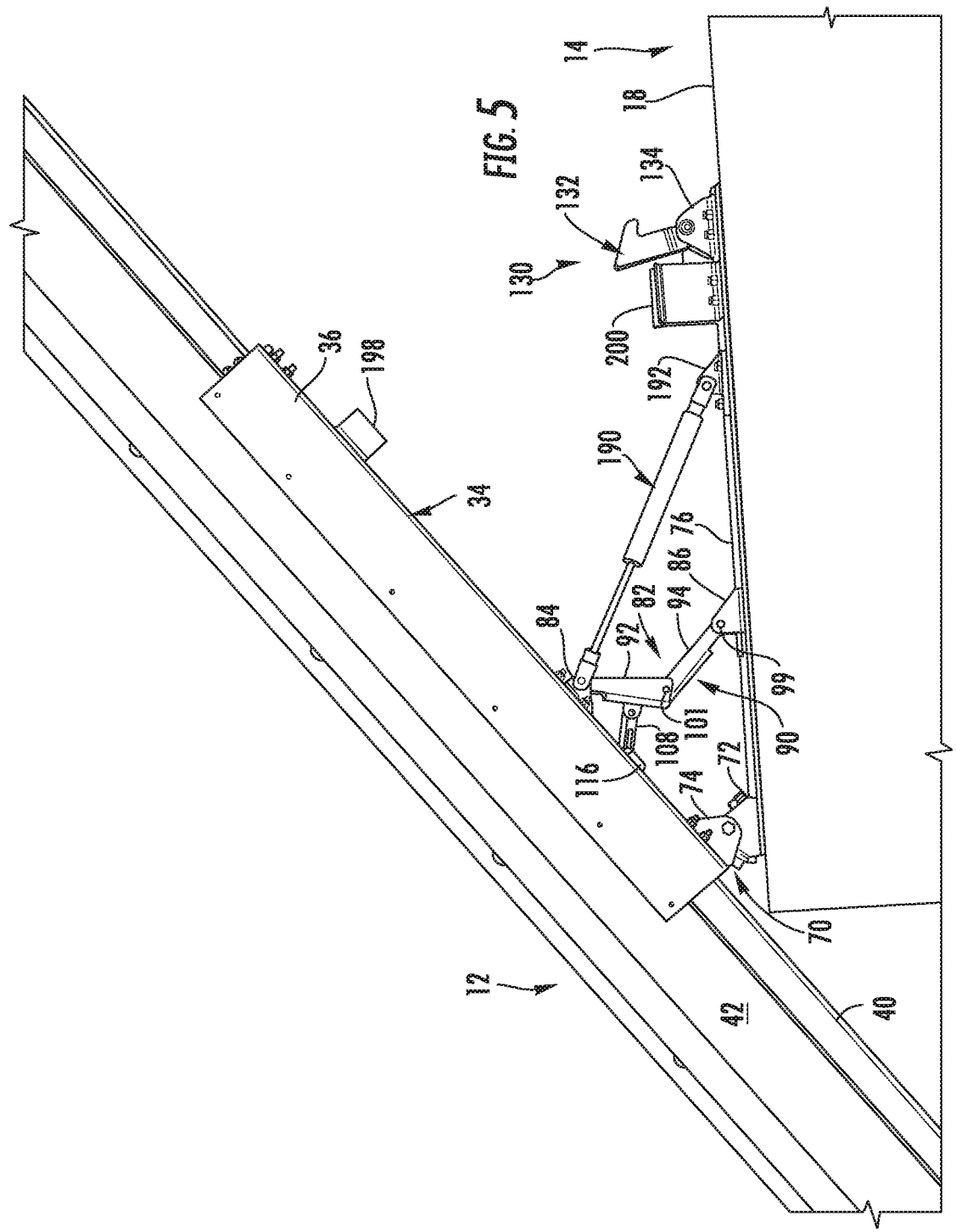

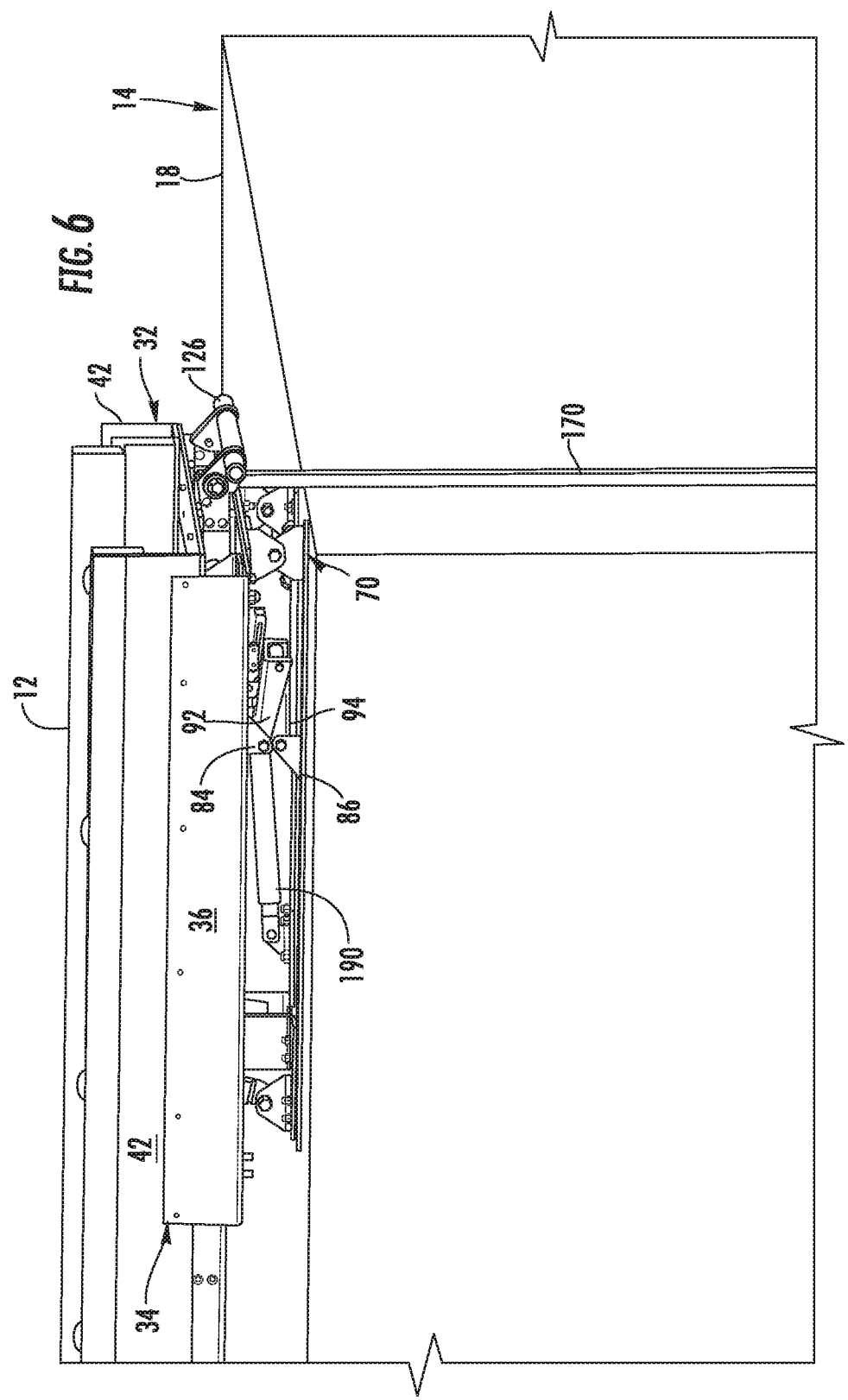

SYSTEMS FOR STORING AND RETRIEVING LADDERS AND OTHER OBJECTS

CROSS-REFERENCE TO RELATED APPLICATIONS

This application is a continuation-in-part of U.S. application Ser. No. 15/961,403, filed Apr. 24, 2018, the contents of which are incorporated by reference herein in their entirety.

BACKGROUND

Statement of the Technical Field

The inventive concepts disclosed herein relate to systems for storing and retrieving objects such as ladders. The systems can be used in connection with emergency vehicles such as fire engines, with other type of vehicles, and with stationary structures.

Description of Related Art

Modern firefighting requires the use of many different types of equipment. This equipment typically is transported to the site of a fire by an emergency vehicle such as a fire engine. Due to the urgent nature of most firefighting operations, the equipment needs to be quickly and easily accessible to the firefighters and other emergency personnel. Consequently, the amount of suitable space for the storage of firefighting equipment on a typical fire engine is limited.

In response to the demand for equipment storage space on emergency vehicles such as fire engines, systems have been developed for storing ladders and other emergency equipment in the otherwise unused space on top of emergency vehicles. To facilitate retrieval of the ladder, some systems use a frame that is mounted on the roof of the emergency vehicle in a manner that permits the frame, and the ladder attached thereto, to be moved rearward in relation to the roof until a portion of the frame and ladder overhang the back of the vehicle. The frame and ladder then can be tilted to provide emergency personnel on the ground with access to the ladder. The ladder and frame are relatively heavy, however, and can be difficult to balance and otherwise handle as they are moved off of the roof and into a position accessible to the emergency responders. These difficulties can be exacerbated by the need for emergency responders to act quickly, and in all type of weather and lighting conditions; and by the height of the roof above the ground, which can limit physical and visual access to the ladder and frame.

SUMMARY

In one aspect of the disclosed technology, systems for storing and retrieving an object include a carriage having a table configured to rotate between a first and a second angular position in relation to a mounting surface for the system, and a trolley mounted on the carriage and configured to hold the object. The systems also include a locking mechanism having a linkage. The linkage includes a first member pivotally coupled to the table at a first pivot point, and a second member configured to be pivotally coupled to the mounting surface at a second pivot point. The second member is pivotally coupled to the first member at a third pivot point. Interfering contact between the first and second members prevents movement of the table past the second angular position.

In another aspect of the disclosed technology, systems for storing and retrieving an object include carriage having a table configured to rotate between a first and a second angular position in relation to a mounting surface for the system, and a trolley mounted on the carriage and configured to hold the object. The systems also include a first locking mechanism having a linkage. The linkage includes a first member pivotally coupled to the table, and a second member pivotally coupled to the first member and configured to be pivotally coupled to the mounting surface. The linkage is configured so that the linkage is collapsed when the table is in the first angular position, and the pivot point undergoes over-center rotation as the table moves from the first to the second angular position.

In another aspect of the disclosed technology, systems for storing and retrieving an object include a carriage configured for mounting on a mounting surface of a vehicle or structure; and a trolley mounted on the carriage. The trolley is configured to hold the object, and to move linearly between a first and a second position in relation to the carriage The systems also include a handle system having a catch configured for mounting on the vehicle or structure; a first arm; a second arm secured to the trolley and coupled to the first arm so that the first arm is pivotable in relation to the second arm. The systems also include a bracket mounted on the second arm and configured to move in relation to the second arm between a first position at which a portion of the bracket engages the catch when the trolley is in the first position of the trolley; and a second position at which the portion of the bracket is disengaged from the catch.

In another aspect of the disclosed technology, the catch is configured to restrain the bracket and the second arm and thereby prevent the trolley from moving from the first to the second position of the trolley when the bracket engages the catch.

In another aspect of the disclosed technology, the carriage includes a table configured to rotate between a first and a second angular position in relation to the mounting surface.

In another aspect of the disclosed technology, the first arm includes a first member and a second member, the first member being disposed telescopically within the second member.

In another aspect of the disclosed technology, the first arm is pivotally coupled to the second arm by a pin.

In another aspect of the disclosed technology, the bracket includes a sleeve configured to slide over the second arm, and a cross member attached to the sleeve, the cross member being configured to engage the catch when the bracket is in the first position of the bracket and the trolley is in the first position of the trolley.

In another aspect of the disclosed technology, the cross member is further configured to disengage from the catch when the bracket is moved from the first to the second position of the bracket and the trolley is in the first position of the trolley.

In another aspect of the disclosed technology, the handle system further includes a release mechanism having a sleeve positioned on the second arm and configured to move between a first and a second position in relation to the second arm. Movement of the sleeve from the first to the second position of the sleeve causes the bracket to move from the first to the second position of the bracket. The release mechanism also includes a linkage coupled to the first arm and the sleeve and configured to move the sleeve from the first to the second position of the sleeve.

In another aspect of the disclosed technology, the catch has a slot formed therein and configured to receive the portion of the bracket when the bracket is in the first position of the bracket and the trolley is in the first position of the trolley; and the release mechanism is configured to raise the portion of the bracket from the slot.

In another aspect of the disclosed technology, the linkage includes a first bar coupled to the first arm so that the first bar can rotate in relation to the first arm; and a second bar coupled to the first arm and the sleeve so that the second bar is pivotable in relation to the first arm and the sleeve. The linkage is configured so that rotation of the first bar in a first direction causes the second bar to move the sleeve from the first to the second position of the sleeve.

In another aspect of the disclosed technology, the release mechanism further includes a cable connected to the first bar and configured to exert a force on the first bar that causes the first bar to rotate in the first direction.

In another aspect of the disclosed technology, the cable extends along an exterior of the first arm over a substantial entirety of a length of the first arm.

In another aspect of the disclosed technology, the sleeve of the release mechanism and the bracket are configured so slide along the second arm.

In another aspect of the disclosed technology, the sleeve of the release mechanism is configured to contact the bracket and urge the bracket from the first to the second position of the bracket when the sleeve moves from the first to the second position of the sleeve.

In another aspect of the disclosed technology, the catch has at least one slot formed therein. The slot is configured to receive the portion of the bracket when the bracket is in the first position of the bracket and the trolley is in the first position of the trolley.

In another aspect of the disclosed technology, the catch includes a base, and at least one ear that extends outward from the base and has a least one slot formed therein. The slot is configured to receive a portion of the cross member when the bracket is in the first position of the bracket and the trolley is in the first position of the trolley.

In another aspect of the disclosed technology, the ear has an edge oriented at an oblique angle in relation to a lengthwise direction of the slot; and the ear is configured so that the edge contacts the cross member and guides the cross member to an entrance to the slot when the trolley moves to the second position of the trolley.

In another aspect of the disclosed technology, the systems also include hand grips mounted on and extending from opposite sides of the lower arm.

In another aspect of the disclosed technology, the systems also include a mounting bracket connected to the second arm and the trolley.

In another aspect of the disclosed technology, the ear is a first ear and the catch further comprises a second ear.

BRIEF DESCRIPTION OF THE DRAWINGS

Embodiments will be described with reference to the following drawing figures, in which like numerals represent like items throughout the figures and in which:

FIG. 5 is a perspective view, looking forward, of the system shown in FIGS. 1-4, with the table locked in its inclined position, the trolley in its rearwardy-extended inclined position, and the ladder in its loading position.

FIG. 6 is a perspective view, looking forward, of the system shown in FIGS. 1-5A, with the table locked in its horizontal position, the trolley in its forward position, and the ladder in its stowed position;

DETAILED DESCRIPTION

The inventive concepts are described with reference to the attached figures. The figures are not drawn to scale and they are provided merely to illustrate the instant inventive concepts. Several aspects of the inventive concepts are described below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operation are not shown in detail to avoid obscuring the inventive concepts. The inventive concepts are not limited by the illustrated ordering of acts or events, as some acts may occur in different orders and/or concurrently with other acts or events. Furthermore, not all illustrated acts or events are required to implement a methodology in accordance with the inventive concepts.

Figure 1:
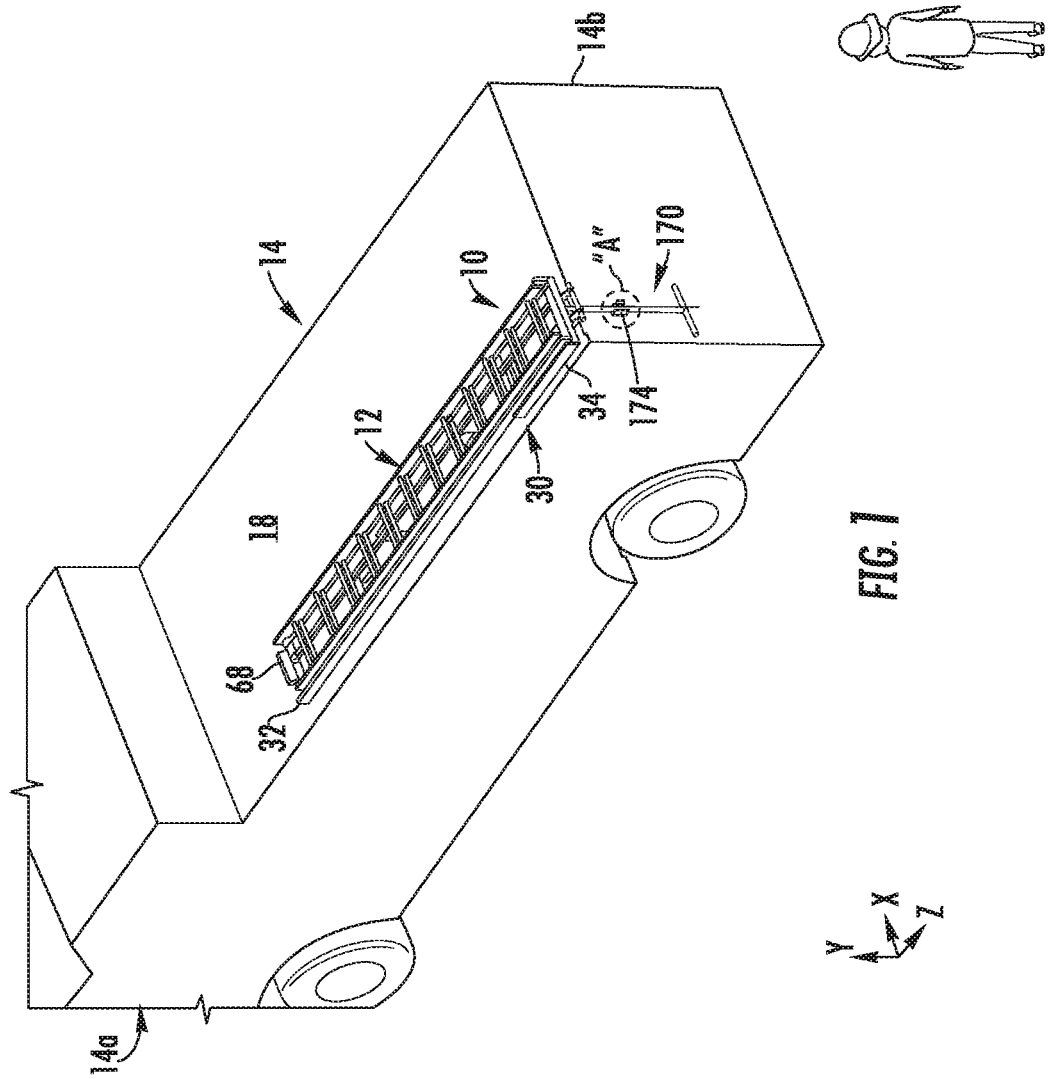
FIG. 1 is a top perspective view, looking forward, of a system for storing and retrieving objects, installed on a fire engine, with a table of the system locked in a horizontal position, and a trolley of the system in its forward position; and with a ladder in its stowed position on the trolley.
Figure 2:
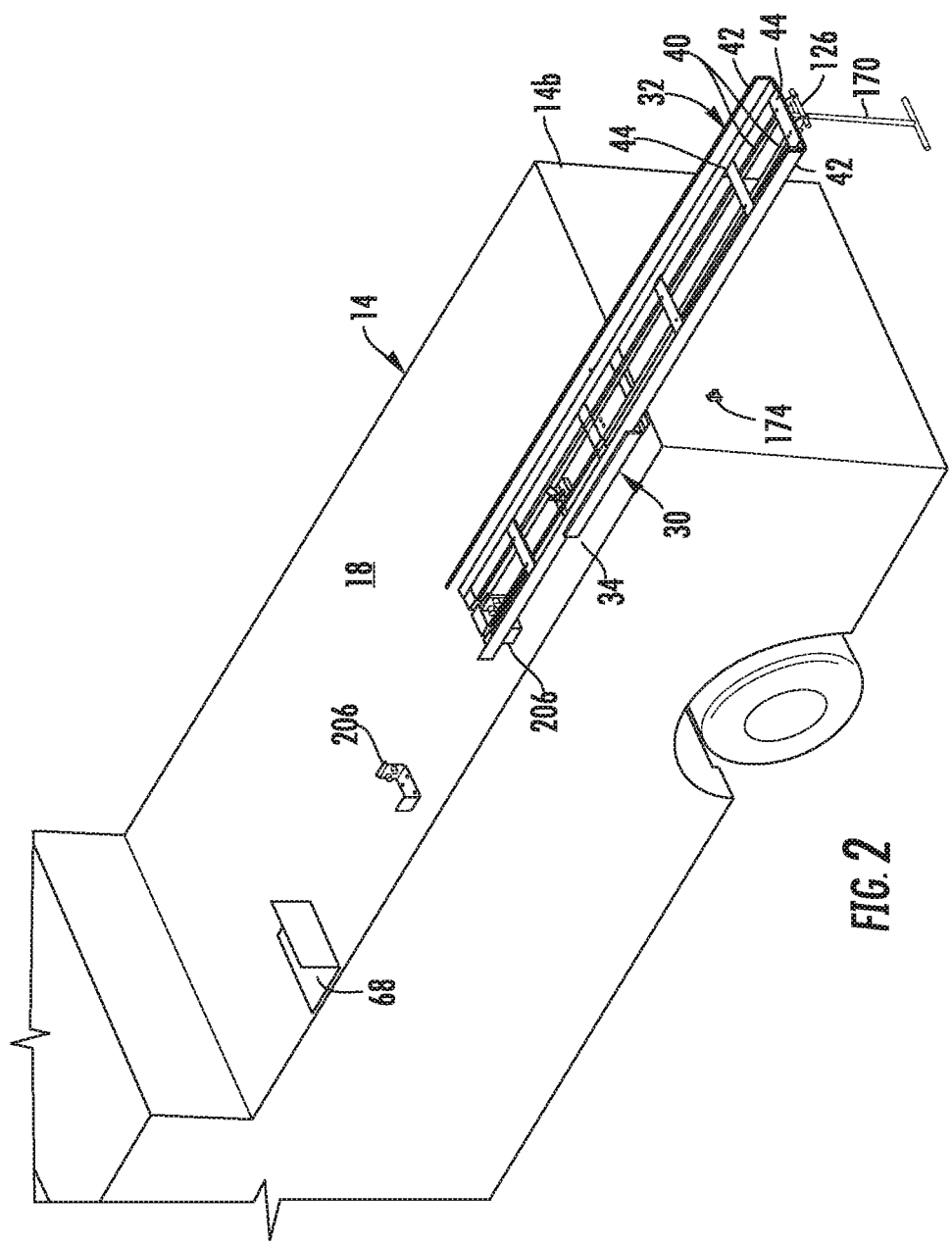
FIG. 2 is a top perspective view, looking forward, of the system shown in FIG. 1, with the table locked in its horizontal position, and the trolley in a rearwardly-extended horizontal position.
Figure 3:
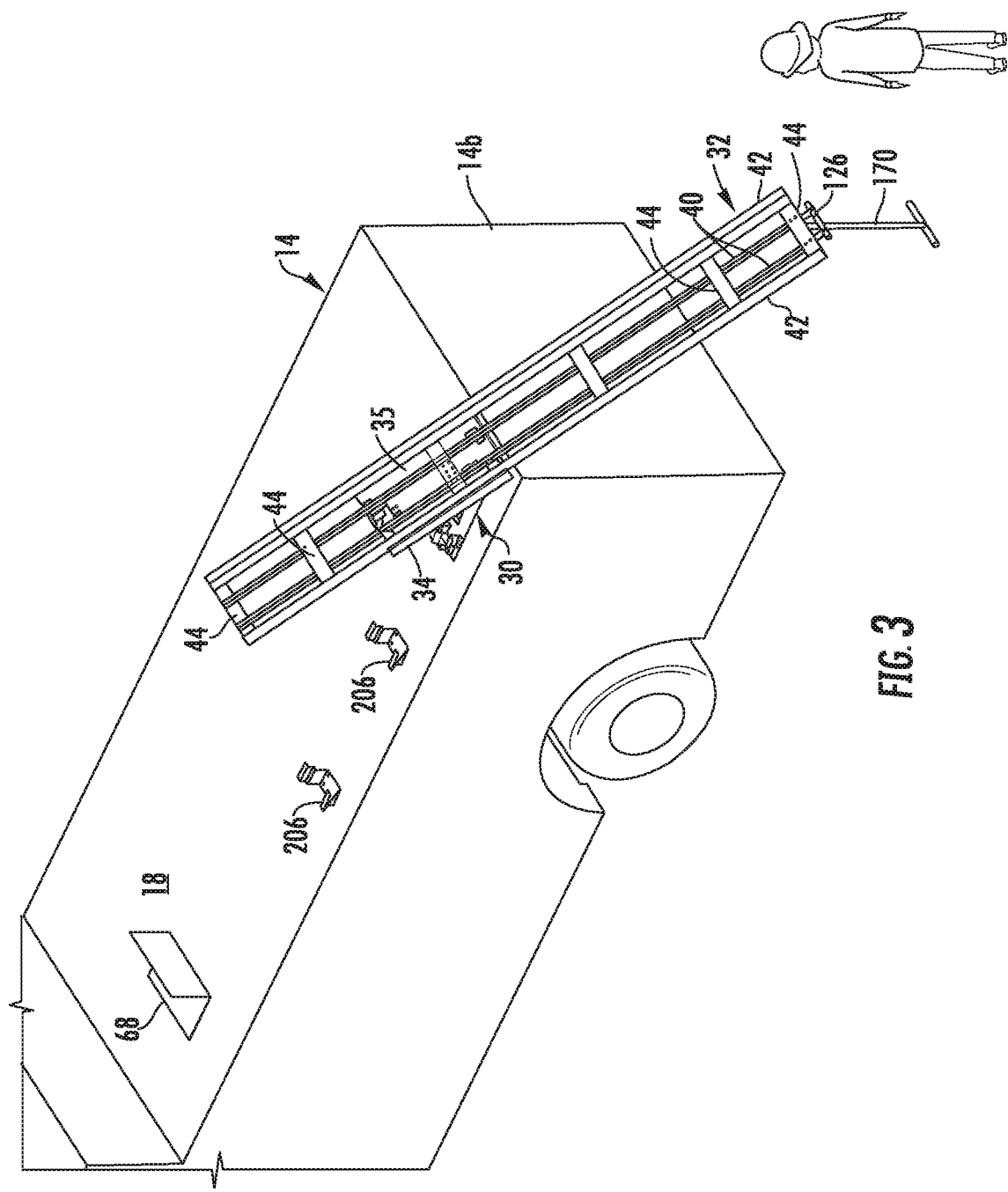
FIG. 3 is a top perspective view, looking forward, of the system shown in FIGS. 1 and 2, with the table locked in an inclined position, and the trolley in a rearwardly-extended inclined position; and with the ladder removed from the trolley.

FIGS. 1-14 depict a system 10 for storing and retrieving objects such as a ladder 12. The system 10 can be mounted on a fire engine 14 as shown in FIGS. 1-3. This particular use is disclosed for exemplary purposes only; the system 10 can be mounted on other types of firefighting equipment and other types of vehicles. The system 10 can also be mounted on stationary structures, such as the roof of a shed or a building. In addition, the system 10 can be used to store and retrieve objects other than ladders.

The system 10 is a mounted on a mounting surface. In the exemplary application disclosed herein, the mounting surface is a substantially flat, upper exterior surface 18 of the fire engine 12. The system 10 is configured to move the ladder 12 between a first, or stowed position shown in FIG. 1, and a second, or loading position shown in FIGS. 4 and 5. When in its stowed position, the ladder 12 has a substantially horizontal orientation and is positioned, in its entirety, above the exterior surface 18, with its forward end proximate the forward end 14a of the fire engine 14; and its back end proximate the back end 14b of the fire engine 14, as shown in FIG. 1. When in the loading position, a portion of the ladder 12 overhangs the back end 14b of the fire engine 14, and the ladder 12 is tilted or inclined in relation to the horizontal so that a bottom of the ladder 12 is located proximate the ground, thereby allowing a firefighter or other user to quickly and easily retrieve the ladder 12 while standing on the ground.

Figure 4:
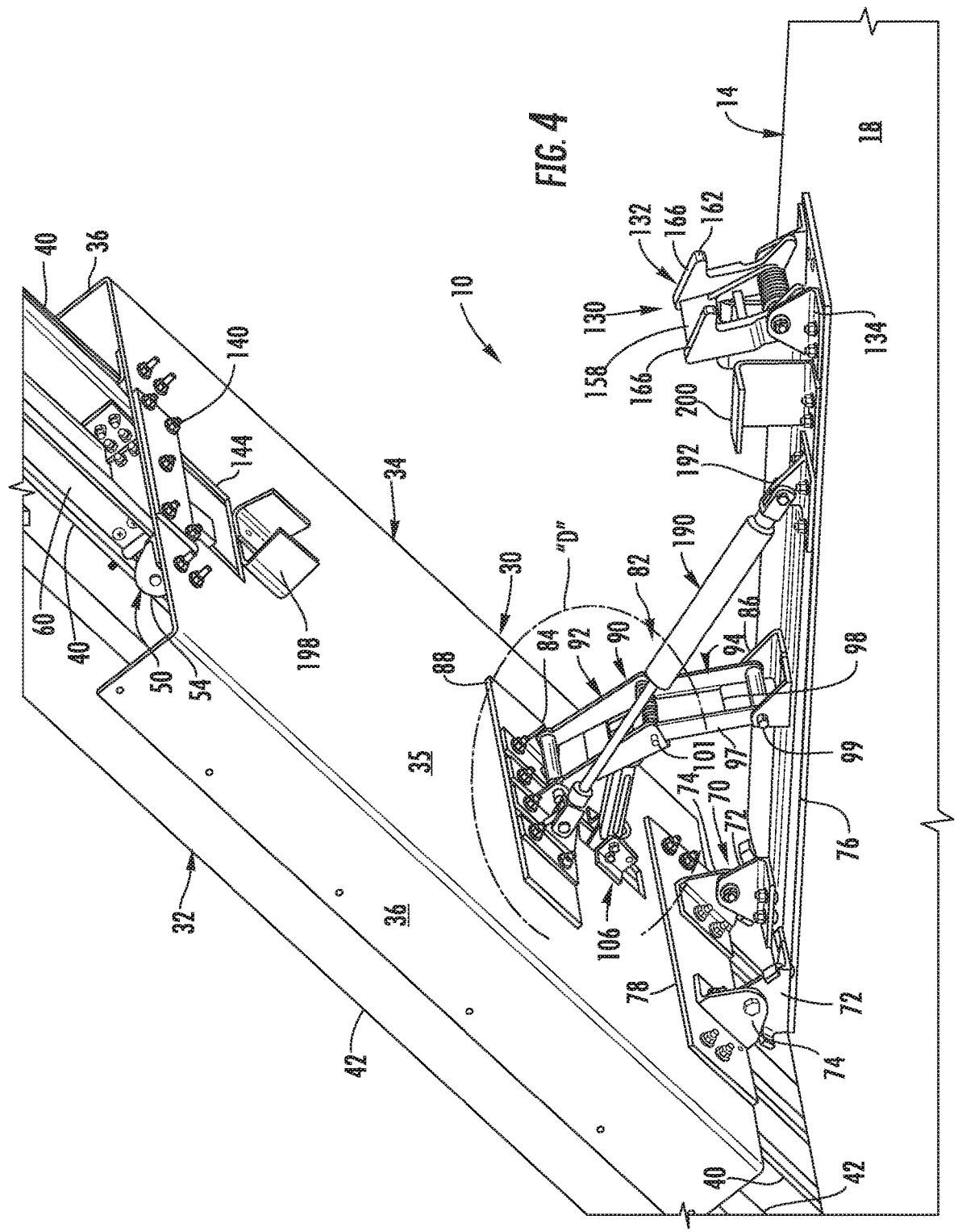
FIG. 4 is a perspective view, looking rearward, of the system shown in FIGS. 1-3, with the table locked in its inclined position, the trolley in its rearwardy-extended inclined position, and the ladder in its loading position.

The system 10 comprises a carriage 30, and an elongated trolley 32. The carriage 30 is mounted on the exterior surface 18 of the fire engine 14 by way of a base 76, as shown in FIGS. 4-6. The base 76 is secured to the exterior surface 18 of the fire engine 14 by fasteners or other suitable means.

The trolley 32 is mounted on the carriage 30, and is configured to securely hold the ladder 12 using hook-shaped brackets (not shown) or other suitable features. The carriage 30 comprises a table 34. The table 34 has a substantially flat bottom portion 35, and two sides 36 that adjoin the bottom portion 35 and extend substantially perpendicular to the bottom portion 35 as shown, for example, in FIG. 4. Alternative embodiments of the table 34 can be constructed without the sides 36.

The trolley 32 is mounted on the table 34 as described in detail below. The table 34 is configured to pivot in relation to the fire engine 12, to facilitate tilting of the trolley 32 and the ladder 12. The carriage 30 configured to permit the trolley 32 to move linearly in its lengthwise ("z") direction in relation to the carriage 30, between a forward position shown in FIG. 1, and a rearwardly-extended horizontal position shown in FIG. 2. The forward position of the trolley 32 corresponds to the stowed position of the ladder 12 depicted in FIG. 1. As explained in detail below, when the trolley 32 is moved into the rearwardly-extended position, the trolley 32 automatically becomes free to rotate into and from a rearwardly-extended inclined position shown in FIGS. 3-5, which allows the ladder 12 to be tilted into and from its loading position as shown in FIGS. 4 and 5.

Figure 8:
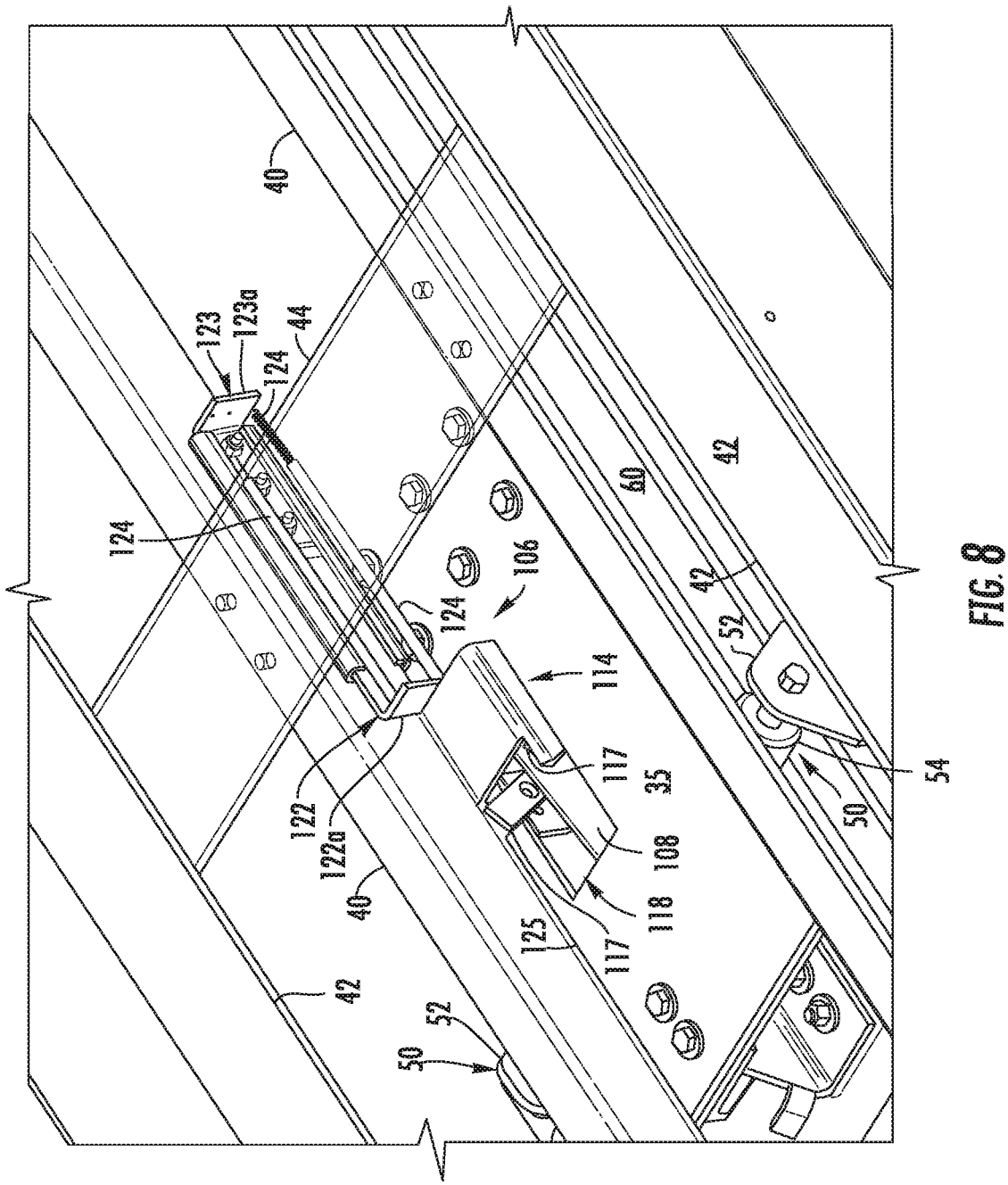
FIG. 8 is a magnified view of the area designated "C" in FIG. 9, without the ladder depicted in FIG. 9.
Figure 9:
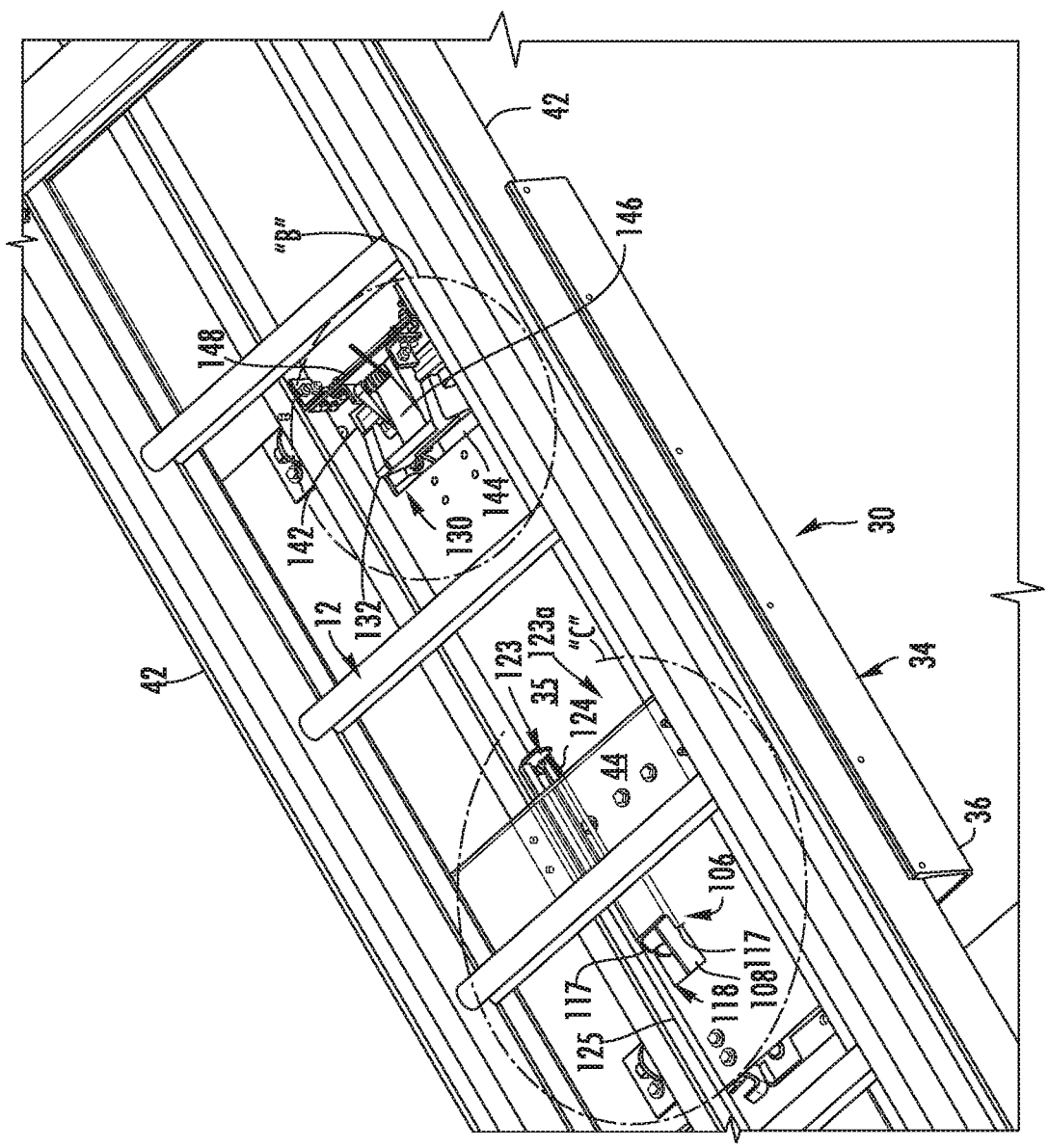
FIG. 9 is a top perspective view, looking forward, of the system shown in FIGS. 1-8, with the table in its horizontal position, and the trolley in its rearwardly-extended, horizontal position, as the table being unlocked to allow the table and trolley to rotate.

The trolley 32 comprises a first and a second rail 40, and a first and a second substantially L-shaped bracket 42 as shown, for example, in FIGS. 3, 8, 9, and 12. The trolley 32 also includes six cross members 44. The first and second rails 40 are substantially parallel, and are attached to the undersides of the cross members 44 by fasteners or other suitable means. The first and second brackets 42 are substantially parallel, and are attached to upper surfaces of the cross members 44 by fasteners or other suitable means. The brackets 42 are spaced apart so that the ladder 12 can be positioned therebetween, as shown in FIG. 9. Alternative embodiments can include more, or less than six cross members 44.

The carriage 30 further comprises four wheel assemblies 50, shown in FIGS. 4, 8, 10, and 12. Each wheel assembly 50 includes a bracket 52, and a wheel 54 mounted for rotation on the bracket 52. Each bracket 52 is secured to an upper surface of the bottom portion 35 of the table 34 by fasteners or other suitable means. The first and second rails 40 each include an outwardly-facing channel 60, as shown in FIGS. 4, 8, 10, 12, and 13. Each channel 60 accommodates two of the wheels 54. The wheels 54 support the trolley 32, and rotate within the channels 60 to facilitate linear movement of the trolley 32 in its lengthwise ("z") direction, between its forward and rearward positions. The wheels 54 also constrain the trolley 32 in the vertical ("y") and lateral ("x") directions, while guiding the trolley 32 in the lengthwise direction. Alternative embodiments can include more, or less than four wheel assemblies 50.

A stop in the form of a pin (not shown) can be mounted on each rail 40 so that the pin protrudes into the channel 60. The pins can be positioned so as to contact the forward-most wheels 54 when the trolley 32 reaches its rearward position, so that further rearward movement of the trolley 32 is prohibited by interfering contact between the wheels 54 and the pins.

A forward stop 68, shown in FIGS. 1-3, can be mounted on the exterior surface 18 of the fire engine 14. The forward stop is positioned so as to interfere with forward movement of the trolley 32 past its forward position. The forward stop 68 can also act to restrain the ladder 12 in the forward direction. Other means for limiting the forward movement of the trolley 32 and the ladder 12 can be used in alternative embodiments.

Figure 7:
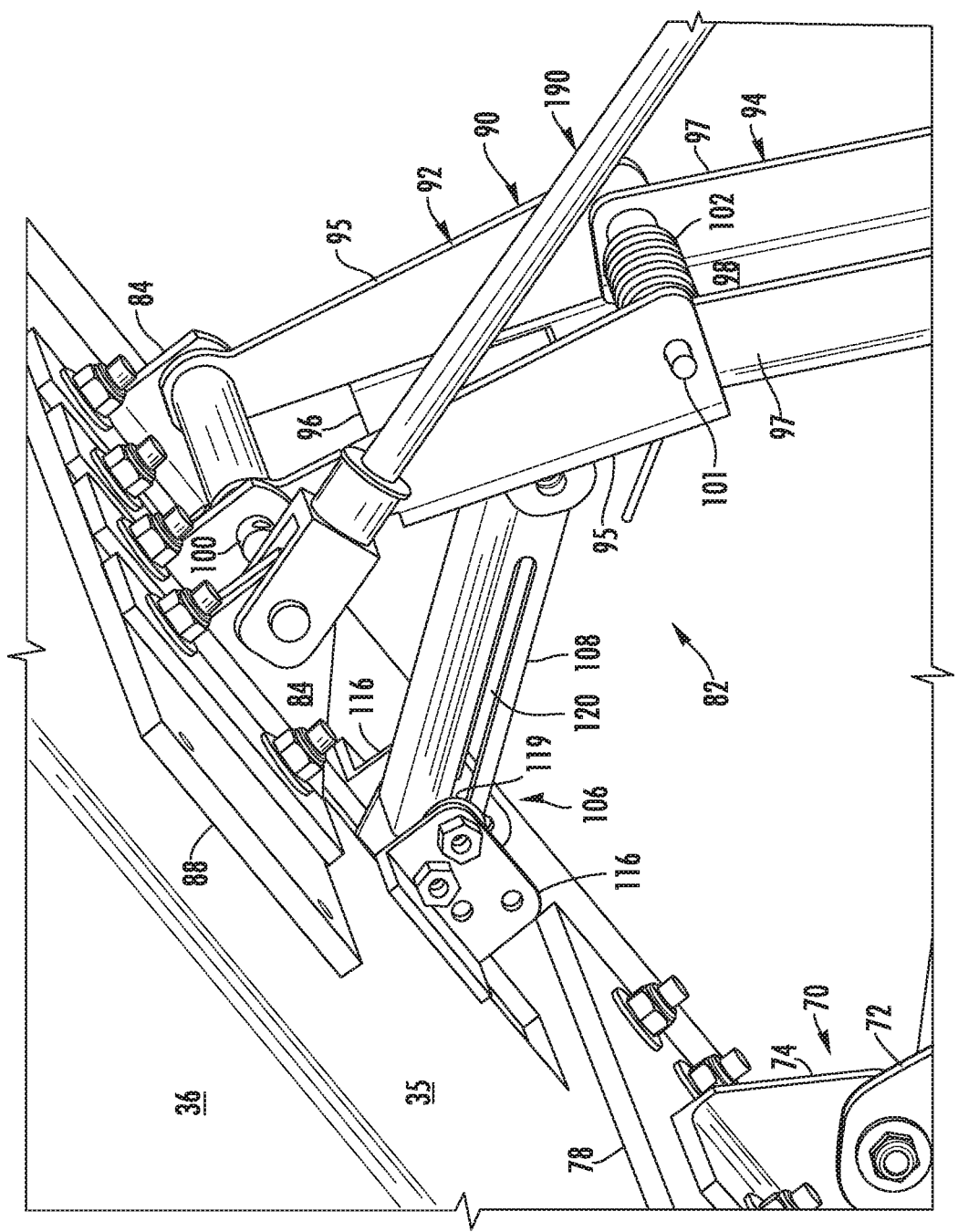
FIG. 7 is a magnified view of the area designated "D" in FIG. 4.

The carriage 30 also includes a mount 70, depicted in FIGS. 4, 5, and 7, that facilitates pivotal movement, or rotation, of the table 34 in relation to the base 76, and the exterior surface 18 of the fire engine 14. The mount 70 includes two stationary brackets 72, and two pivoting brackets 74. Each stationary bracket 72 is secured to the base 76 by fasteners or other suitable means.

Each pivoting bracket 74 is coupled to a corresponding one of the stationary brackets 72 by way of a fastener or other suitable means that permits the pivoting bracket 74 to pivot in relation to the stationary bracket 72. The pivoting brackets 74 are secured to a first mounting plate 78 by fasteners or other suitable means. The first mounting plate 78 is secured to an underside of the bottom portion 35 of the table 34 by fasteners or other suitable means. The mount 70 permits the table 34 to pivot, or tilt between a substantially horizontal position shown in FIGS. 1, 2, 6, 8, 9, and 11; and an inclined position depicted in FIGS. 3-5, 7, and 12. The pivoting of the table 34 allows the ladder 12, which is mounted on the table 34 by way of the trolley 32 and the wheel assemblies 50, to pivot between the substantially horizontal orientation corresponding to its stowed position, and the inclined orientation corresponding to its loading position.

The system 10 also includes a first locking mechanism 82 that locks the carriage 30, and the attached trolley 32 and ladder 12, in the inclined orientation shown in FIG. 3. The first locking mechanism 82 comprises an upper bracket 84 and a lower bracket 86 as illustrated in FIGS. 4-7. The lower bracket 86 is secured to the base 76 by fasteners or other suitable means. The upper bracket 84 is secured to a second mounting plate 88 by fasteners or other suitable means. The second mounting plate 88 is secured to an underside of the bottom portion 35 of the table 34 by fasteners or other suitable means.

The first locking mechanism 82 also includes a linkage 90 having an upper member 92 and a lower member 94. The upper member 92 includes two arms 95, and a web 96 that adjoins, and connects the arms 95 as can be seen in FIG. 7. The lower member 94 likewise includes two arms 97, and a web 98 that adjoins, and connects the arms 97.

A first end of the lower member 94 is coupled to the lower bracket 86 by way of a lower pin 99 or other suitable means that permits the lower member 94 to pivot in relation to the lower bracket 86, as depicted in FIGS. 4-6. A first end of the upper member 92 is coupled to the upper bracket 84 by way of an upper pin 100 or other suitable means that permits the upper member 92 to pivot in relation to the upper bracket 84, as shown in FIG. 7. A second end of the upper member 92 is coupled to a second end of the lower member 94 by way of a pivot pin 101 or other suitable means that permits the upper member 92 to pivot in relation to the lower member 94, as illustrated in FIGS. 4-7.

The locking mechanism 82 also includes a spring 102 positioned around the pivot pin 101, as depicted in FIG. 7. The spring 102 is configured to rotationally bias the upper member 92 about the upper pin 100 in the counterclockwise direction, from the perspective of FIG. 7; while rotationally biasing the lower member 94 about the lower pin 99 in the clockwise direction.

Figure 5A:
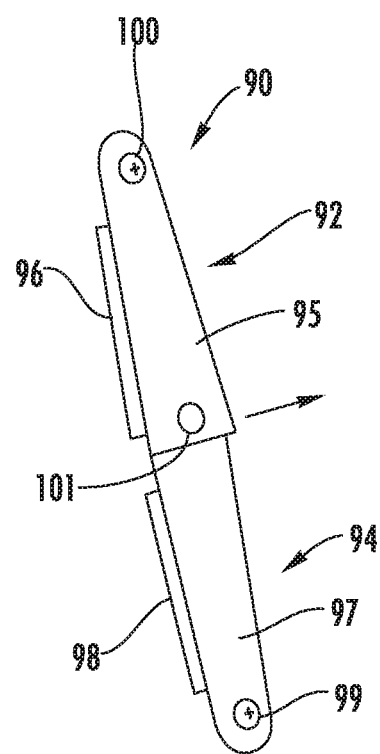
FIG. 5A is a side view of a linkage of a locking mechanism of the system shown in FIGS. 1-5, showing a pivot point of the linkage in a center position.

The linkage 90 is configured to collapse as shown in FIGS. 5 and 6 as the table 34 moves from its inclined to its horizontal position, with the lower member 94 becoming nested with the upper member 92 as the table 34 reaches its horizontal position as can be seen in FIG. 6. In particular, as the table 34 moves from its horizontal to its inclined position, the pivoting movement of the table 34 causes the linkage 90 to extend from its collapsed position shown in FIG. 6, with the pivot pin 101 acting as a pivot point between the upper and lower members 92, 94. The lower member 94 (and the pivot pin 101) rotate about the lower pin 99 in a clockwise direction; and the upper member 92 (and the pivot pin 101) rotate about the upper pin 100 in a counterclockwise direction, from the perspective of FIG. 5. The linkage 90 is configured so that, as the carriage 30 approaches its inclined position, the pivot pin 101 reaches, and passes through and past a center position, i.e., a position located directly between the lower and upper pins 99, 100, as shown in FIG. 5A, to an over-center position shown in FIGS. 4 and 7. The rotation of the pin 101 to its over-center position is encouraged by the above-noted bias of the spring 102.

The linkage 90 acts as a stop that limits rotation of the table 34 past the inclined position. In addition, the linkage 90 prevents the table 34 from pivoting back toward its horizontal position once the table 34 reaches the inclined position. In particular, the upper and lower members 92, 94 are configured so that the web 98 of the lower member 94 and the web 96 of the upper member 92 contact each other as shown in FIGS. 4 and 7 as the table 34 reaches its inclined position, and as the pivot pin 101 reaches its over-center position. This contact results in interference between the web 98 and the web 96, and the interference prevents any further movement of the pivot pin 101 past its over center position, and any further tilting of the table 34. In other words, the interference between the web 98 and the web 96 prevents further clockwise rotation of the lower member 94 (and the pivot pin 101) about the lower pin 99; and further counterclockwise rotation of the upper member 92 (and the pivot pin 101) about the upper pin 100, thereby limiting the travel of the linkage 90 (and the table 34) to the positions depicted in FIGS. 4 and 7.

The table 34, and the attached ladder 12, are inclined at an angle of approximately 45 degrees in relation to the horizontal when the table 34 reaches its inclined position. It is believed that this angle results in ready access to the ladder 12 by the firefighter or other user; while helping to minimize the extent to which the trolley 32 overhangs the back end 14b of the fire engine 14. Minimizing the extent to which the trolley 32 overhangs the back end 14b of the fire engine 14 helps to minimize the mechanical stresses on the carriage 30 and the trolley 32. Also, the back end of the trolley 32 is positioned between about 36 inches and about 48 inches above the ground when the trolley 32 is in its rearwardly-extended inclined position. Specific values for the orientation and position of the trolley 32 are provided for exemplary purposes only; these values can be varied in alternative embodiments of the system 10.

The configuration of the linkage 90 also causes the table 34 to remain locked in its inclined position. In particular, due to the kinematics of the linkage 90 at the position depicted in FIGS. 4 and 7, the combined weight of the carriage 30, the trolley 32, and the ladder 12 urges the lower member 94 (and the pivot pin 101) toward further clockwise rotation about the lower pin 99; and urges the upper member 92 (and the pivot pin 101) toward further counterclockwise rotation about the upper pin 100, from the perspective of FIG. 4. In other words, the noted weight urges the pivot pin 101 further past its over-center position. Thus, the pivot pin 101, i.e., the pivot point between the upper and lower members 92, 94, is discouraged from reversing back toward, and back through its center position shown in FIG. 5A, thereby preventing the linkage 90 from returning to its collapsed position. At the same time, the noted interference between the upper and lower members 92, 94 stops any further movement of the pivot pin 101 past its over-center position depicted in FIGS. 4 and 7. The carriage 30, therefore, will automatically become locked in, and will remain locked in its inclined position until the pivot pin 101 is retracted back toward, and then past its center position. This feature permits the user to load and unload the ladder 12 while the trolley 32 and the ladder 12 are in a secure position free from the potential for unintentional rotation which could result in injury or loss of balance to the user, or which could cause the user drop the ladder 12.

The first locking mechanism 82 further includes a release 106 that operates to release the carriage 30 from its inclined position. The release is shown in FIGS. 4, 5, 7-9, and 12. The release 106 includes an arm 108, and a slide 114. The slide 114 includes an upper member 115, two brackets 116, and two arms 117.

The slide 114 is mounted for sliding movement within in an opening 118 in the bottom portion 35 of the table 34. As shown in FIG. 8, the upper member 115 rests on the upper surface of the bottom portions 35, and straddles the opening 118. The brackets 116 are located on the underside of the bottom portion 35, on opposite sides of the opening 118 as illustrated in FIG. 4. Each bracket 116 is connected to the upper member 115 by way of a respective arm 117 secured to the upper member 115 and the bracket 116 by a suitable means such as fasteners or welding. The arms 117 act to restrain the actuator in the lateral ("x") direction, and also act as forward and rearward stops for the slider 117 in the lengthwise ("z") direction.

A first end of the arm 108 is coupled the web 96 of the upper member 92 by way of a pin or other suitable means that permits the arm 108 to pivot in relation to the upper member 92, as shown in FIGS. 4, 5, and 7. The first end of the arm 108 can be coupled the web 98 of the lower member 94 in alternative embodiments.

A second end of the arm 108 is coupled to the brackets 116 and the arms 117 by way of a pin 119 or other suitable means that permits the arm 108 to pivot in relation to the brackets 116 and the arms 117. The arm 108 has a slot 120 formed therein. The pin 119 is positioned in the slot 120 as can be seen in FIG. 7, so that the arm 108 can move linearly, as well as rotationally, in relation to the brackets 116 and the arms 117.

The release 106 also includes an actuator 121 configured to move the slide 114 and the attached arm 108. The actuator 121 is visible in FIGS. 8, 9, and 12. The actuator 121 includes a substantially L-shaped movable bracket 122, and a substantially L-shaped stationary bracket 123. The stationary bracket 123 is mounted on an inwardly-facing surface of one of the rails 40, proximate the slide 114, as can be seen in FIG. 8. The stationary bracket 123 is configured to hold the movable bracket 122, and to restrain the movable bracket 122 in the vertical ("y") and lateral ("x") directions, while permitting a limited amount of relative movement of the movable bracket 122 in the lengthwise ("z") direction.

The release 106 further comprises two springs 124. A first end of each spring 124 is connected to an end 122a the movable bracket 122, and a second end of each spring 124 is connected to an end 123a of the stationary bracket 123 as shown in FIG. 8. The springs 124 thereby bias the movable bracket 122 in a direction away from the slide 114. Alternative embodiments can include more, or less than two springs 124.

Figure 12:
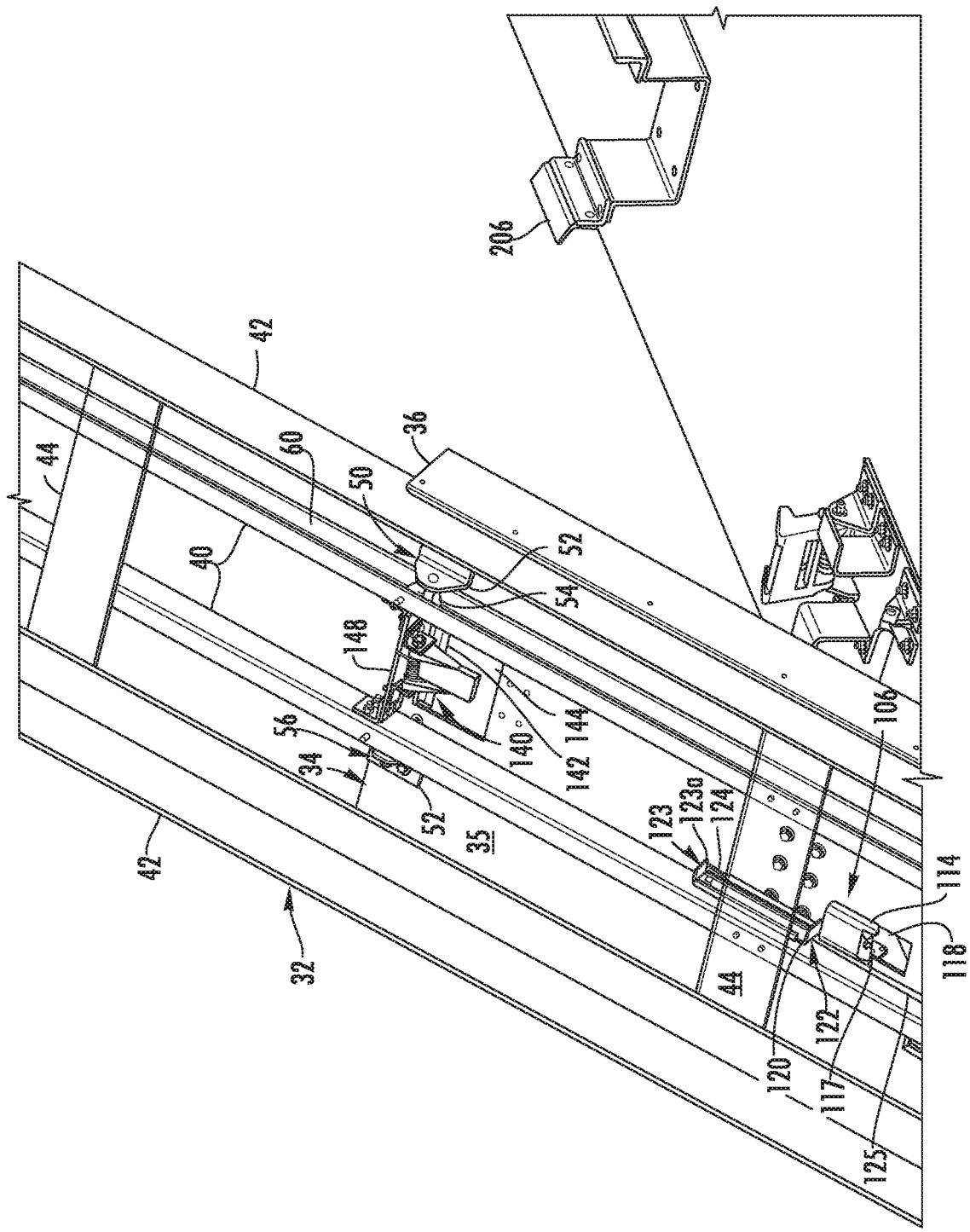
FIG. 12 is a top perspective view, looking forward, of the system shown in FIGS. 1-11, with the table locked in its inclined position, and the trolley in its rearwardly-extended, inclined position.
Figure 13:
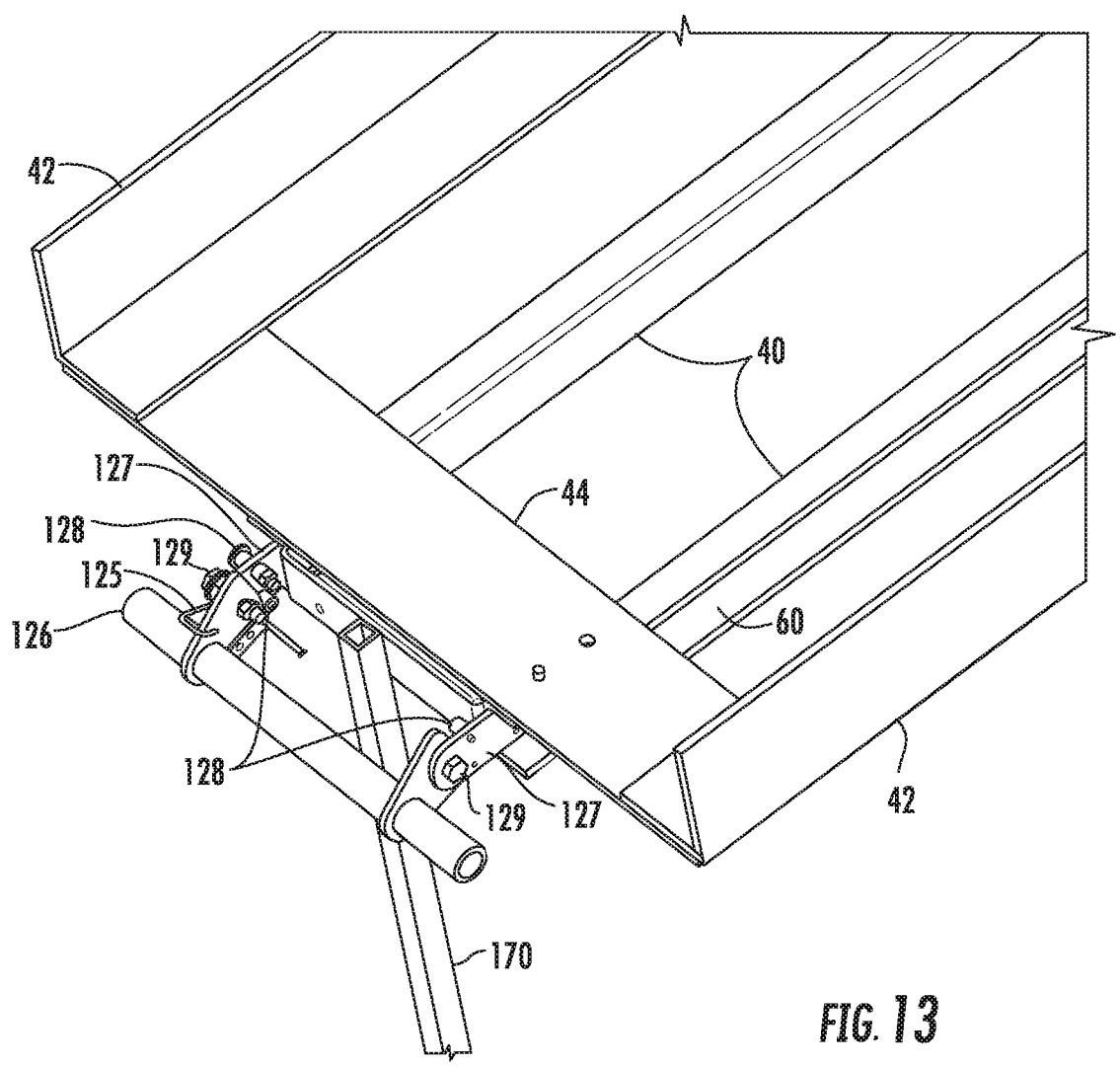
FIG. 13 is a top perspective view, looking forward, of a back end of the trolley of the system shown in FIGS. 1-12.

The release 106 also includes a cable 125, and a handle 126. A first end of the cable 125 is connected to the end 122a of the movable bracket 122 as shown in FIGS. 8, 9, and 12. A second end the cable is connected to the handle 126, as shown in FIG. 13. The handle 126 supported by two brackets 127. Each bracket 127 is securely mounted on the back end of a respective one of the rails 40. The handle 126 is coupled to the brackets 127 by pins 129 or other means that permit the handle 126 to pivot in relation to the brackets 127 and the rails 40. Stops 128 are mounted on the brackets 127 to limit the rotational or pivoting movement of the handle 126.

The release 106 can be activated by the user, when the user wishes to move the ladder 12 from its inclined to its horizontal orientation. This typically is done when the user wishes to store the ladder 12 after use. The release is activated by the user pushing down on the handle 126, which causes the handle 126 to rotate about the pins 129 in a counterclockwise direction from the perspective of FIG. 13. The rotation of the handle 126 places the cable 125 in tension, which in initially causes the end 122a of the movable bracket 122 to move toward, and into contact with the slide 114, against the bias of the springs 124. Further rotation of the handle 126 increases the tension in the cable 125, which causes the movable bracket 122 to push the slide 114 rearward, in the "z" direction. The rearward movement of the slide 114 initially pulls the pin 119 to the back end of the slot 120. Further rearward movement of the slide 114 causes the pin 119 to pull the attached arm 108 rearward. The rearward movement of the arm 108, in turn, causes the upper member 92 of the linkage 90, to which the arm 108 is attached, to rotate in a clockwise direction about the upper pin 100, from the perspective of FIG. 7. This movement draws the pivot pin 101 back toward, and back through its center position shown in FIG. 5A which, as explained above, permits the linkage 90 collapse toward the position shown in FIG. 6, thereby allowing the carriage 30, the trolley 32, and the ladder 12 to be rotated into their respective horizontal orientations.

The system 10 further comprises a dampener 190. A first end of the dampener 190 is coupled to a bracket 192 secured to the base 76, as can be seen in FIGS. 4-6. The first end of the dampener 190 is coupled to the bracket 192 by a pin or other suitable means that permits the dampener 190 to pivot in relation to the bracket 102, the base 76, and the underlying surface 18 of the fire engine 14.

A second end of the dampener 190 is coupled to the upper bracket 84 of the first locking mechanism 82. The second end of the dampener 190 is coupled to the upper bracket 84 by a pin or other suitable means that permits the dampener 190 to pivot in relation to the upper bracket 84 and the overlying table 34.

The dampener 190 dampens, and thus slows, the rotational movement of the table 34 as the table 34 rotates between its inclined and horizontal positions. The dampening can help to control the rotational speed of the table 34 as it is tilted by the user. The damping effect thereby can help to avoid damage to the system 10, ladder 12, and fire engine 14, and injury to the user, that otherwise could occur when the combined weight of the table 34, trolley 32, and ladder 12 cause the table 34 to rotate at an excessive rate.

Figure 10:
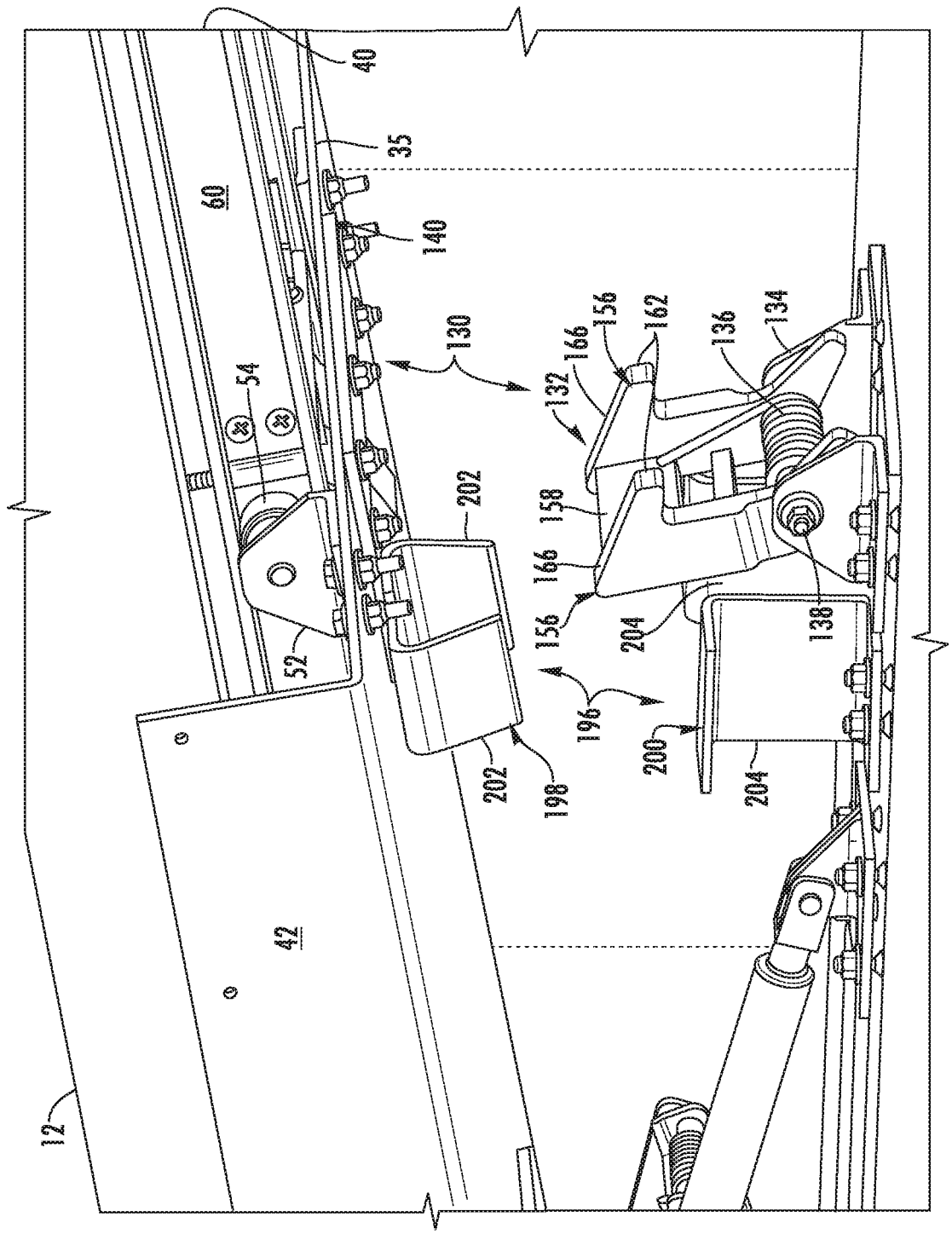
FIG. 10 is a perspective view, looking rearward, of the system shown in FIGS. 1-9, with the table moving between its horizontal and inclined positions, and the trolley moving between its rearwardly-extended inclined position and its rearwardly-extended horizontal position.

The system 10 also includes a centering mechanism 196 that helps to center the table 34 as the table 34 rotates into its horizontal orientation. The centering mechanism 196 includes a plug 198 and a receptacle 200, as illustrated in FIGS. 4, 5, and 10. The plug 198 is securely mounted on an underside of the bottom portion 35 of the table 34, by fasteners or other suitable means. The receptacle 200 is securely mounted on the base 76 by fasteners or other suitable means. The plug 198 has two tangs 202 configured to engage sides 204 of the receptacle 200 as the table 34 approaches, and reaches its horizontal orientation. The bottoms of the tangs 202 are more closely spaced from each other than the tops of the tangs 202, as can be seen in FIG. 10. This feature helps the bottom of the plug 198 to enter the receptacle 200 when some degree of misalignment is present between the plug 198 and the receptacle 200. Contact between the tangs 202 and the sides 204 of the receptacle 200 helps to center the table 34, and the other components of the system 10 mounted thereon, in relation to the base 76. Contact between the tangs 202 and the sides 204 of the receptacle 200 also helps to restrain the table 34, trolley 32, and ladder 12 in the lateral ("x") direction. The plug 198 can be mounted on the base 76, and the receptacle 200 can be mounted on the bottom portion 35 of the tray 34 in alternative embodiments.

The system 10 also can include brackets 206 mounted on the exterior surface 18 of the fire engine 14, forward of the base 76. The brackets 206 are visible in FIGS. 3 and 12. The brackets 206 are configured to engage and support the trolley 32 when the trolley 32 is in its forward position.

The system 10 also includes a second locking mechanism 130 that locks the table 34, and the attached trolley 32 and ladder 12, in the horizontal orientations shown in FIGS. 1, 2, 6, and 8-10. The second locking mechanism 130 comprises a latch 132, a bracket 134, and a spring 136, as depicted in FIGS. 4, 5, and 10. The bracket 134 is secured to the base 76 by fasteners or other suitable means. The latch 132 is coupled to the bracket 134 by a pin 138 or other suitable means that permits the latch 132 to pivot in relation to the bracket 134. The spring 136 is positioned around the pin 138, and rotationally biases the latch 132 about the pin 138 in a clockwise direction, from the perspective of FIG. 10. As shown in FIG. 10, the latch 132 includes two hook portions 156, and a web 158 that adjoins, and connects the hook portions 156.

Figure 11:
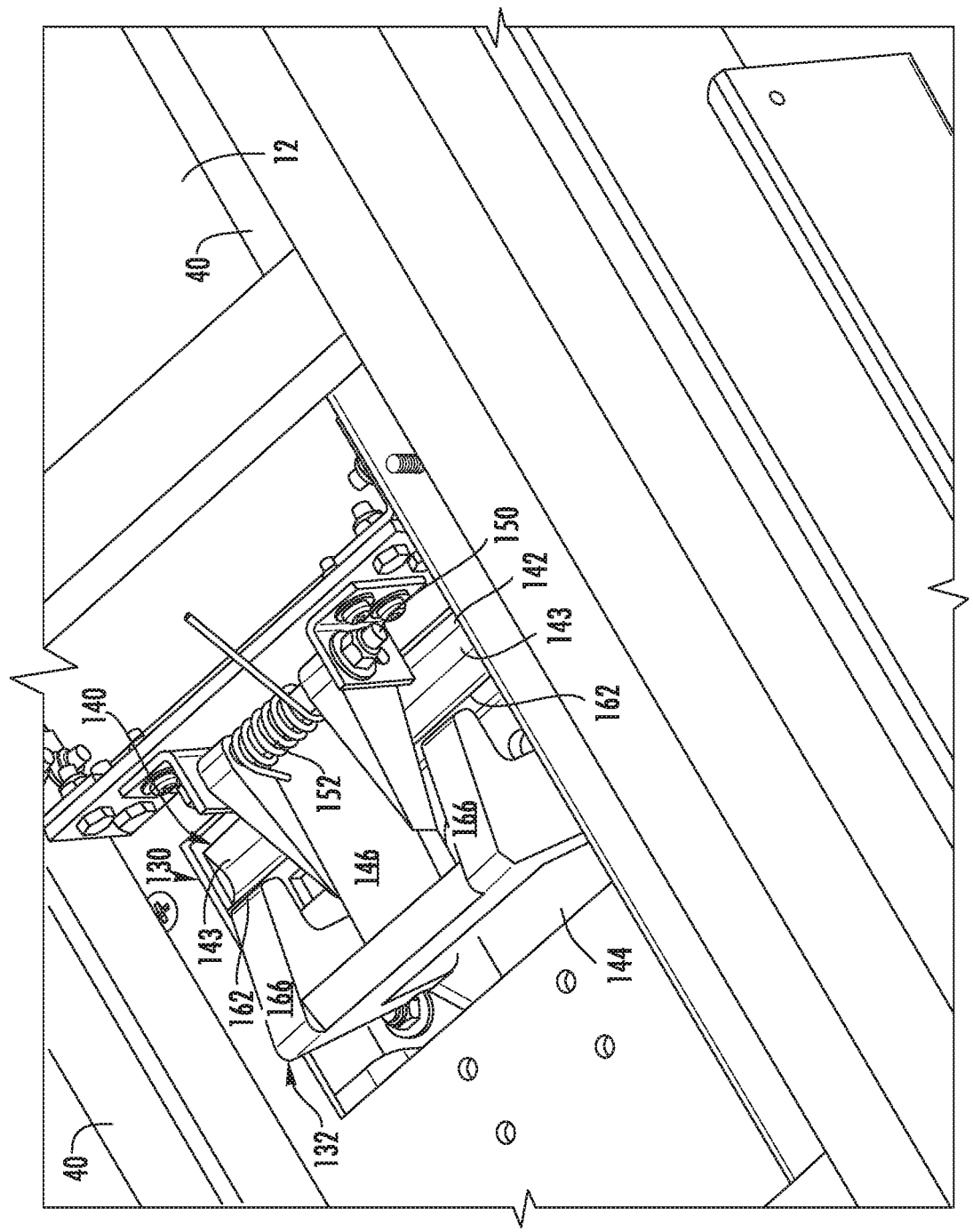
FIG. 11 is a magnified view of the area designated "B" in FIG. 9.

The second locking mechanism 130 also includes a catch 140, which is visible in FIGS. 4 and 9-12. The catch 140 is secured to the underside of the bottom portion 35 of the table 34 by fasteners or other suitable means. The catch 140 has a first portion 142 with an upwardly-facing recess 143 formed therein. The first portion 142 is aligned with an opening 144 formed in the bottom portion 35 of the table 34. The recess 143 thus is accessible from above, as shown in FIGS. 9, 11, and 12.

The latch 132 can retain the table 34, trolley 32, and ladder 12 in their horizontal orientations. In particular, the second locking mechanism 130 is configured so that ends 162 the hook portions 156 of the latch 132 contact the recessed area 143 in the catch 142 when the table 34 is in its horizontal orientation, with the bias of the spring 136 urging the ends 162 into contact with the recessed area 143. Thus, any upward tilting of the table 34, i.e., rotation of the table 34 in the counterclockwise direction from the perspective of FIG. 10, is prevented by interfering contact between the catch 142, which is secured to the table 34; and the latch 132, which is secured to the exterior surface 18 of the fire engine 14 by way of the bracket 134 and the base 76.

The latch 132 is configured to automatically engage the catch 140 as the table 34 rotates from its inclined to its horizontal position. In particular, as the table 34 approaches its horizontal position, a rearward edge of the first portion 142 of the catch 140 comes into contact with an angled upper surface 166 on each of the hook portions 156 of the latch 132. Further rotation of the table 34 results in interfering contact between the upper surfaces 166 and the first portion 142 of the catch 140. Due to the angled orientation of the upper surfaces 166, this contact causes the latch 132 to rotate in a counterclockwise direction from the perspective of FIG. 10, against the bias of the spring 136, as the upper portion of the latch 132 passes through the opening 144. The latch 132 continues to rotate in this manner until the ends 162 of the hook portion 156 reach and pass over the edge of the first portion 140, at which point of the bias of the spring 136 causes the latch 132 to rotate clockwise, which in turn causes the hook portions 156 to engage the upper surface of the bottom portion 35 of the table 34, thereby locking the table 34 is in its horizontal orientation.

The second locking mechanism 130 includes features that unlock the table 34 so that the table 34 can rotate to its inclined position. In particular, the second locking mechanism 130 further comprises a tongue 146, and a bracket assembly 148. The bracket assembly 148 is positioned between the rails 40 as shown in FIGS. 9, 11, and 12, and is secured to the rails 40 by fasteners or other suitable means. As can be seen in FIG. 11, the tongue 146 is coupled to the bracket assembly 148 by a pin 150 or other suitable means that permits the tongue 146 to pivot in relation to the bracket assembly 148. The second locking mechanism 130 further comprises a spring 152 positioned around the pin 150. The spring 152 rotationally biases the tongue 146 about the pin 150 in a clockwise direction, from the perspective of FIG. 11. A stop (not shown) causes the tongue 146 to remain in a substantially horizontal orientation when it is not being contacted by the latch 132 as discussed below.

Because the tongue 146 is mounted on the rails 40, the tongue 146 moves linearly, in the "z" direction, with the trolley 32. The tongue 146 is configured to release the latch 132 when the trolley 32 reaches its rearwardly-extended position. In particular, as the trolley 32 approaches its rearwardly-extended horizontal position shown in FIG. 2, the tongue 146, which is aligned with the web 158 of the latch 132, contacts the web 158. Further rearward movement of the trolley 32 toward its rearwardly-extended position causes the tongue 146 to push against the web 158 in a rearward direction, which in turn causes the latch 132 to rotate about the pin 138 in a counterclockwise direction from the perspective of FIG. 11, against the bias of the spring 136. The rotation of the latch 132 eventually moves the hook portions 156 out of contact with the table 34 as shown in FIGS. 9 and 11, thereby removing the restraint on the tilting movement of the table 34. The table 34, and the trolley 32 and the ladder 12 thus can be moved to their inclined orientations at this point. It follows also that the trolley 32 will remain locked in its horizontal orientation whenever the trolley 32 is located at any point forward of its rearwardly-extended position. This feature can prevent the trolley 32 from being rotated prematurely, i.e., before the trolley 32 reaches its rearwardly-extended position, thereby preventing interference between, and damage to the trolley 32 and the fire engine 14, and possible injury to the individual retrieving or storing the ladder 12, that otherwise could occur as a result of premature rotation of the trolley 32.

The ability of the tongue 146 to pivot permits the tongue 146 to move past the now stationary latch 132 as the tongue 146 moves upward with the trolley 32. Once the tongue 146 has cleared the latch 132, the latch 132 returns to its neutral position, depicted in FIG. 12, due to the bias of the spring 136. The latch 132 is then ready to re-engage the catch 140 when the table 34 is returned to its horizontal orientation.

The system 10 further includes a second handle 170, depicted in FIGS. 1-3, 13, and 14. The handle 170 is securely mounted on a bracket 172, which in turn is securely mounted on the back ends the rails 40. The handle 170 can be utilized by the user to pull and push the trolley 32 (and the attached ladder 12) between its forward and rearwardly-extended positions. The handle 170 has a length sufficient to allow the user to move the trolley 32 while standing on the ground.

Figure 14:
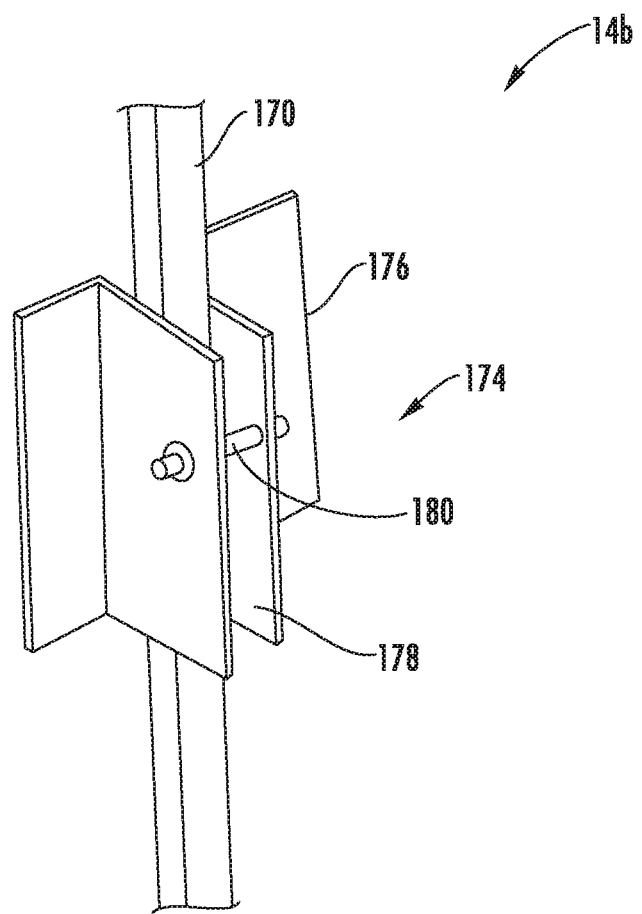
FIG. 14 is a magnified view of the area designated "A" in FIG. 1.
Figure 15:
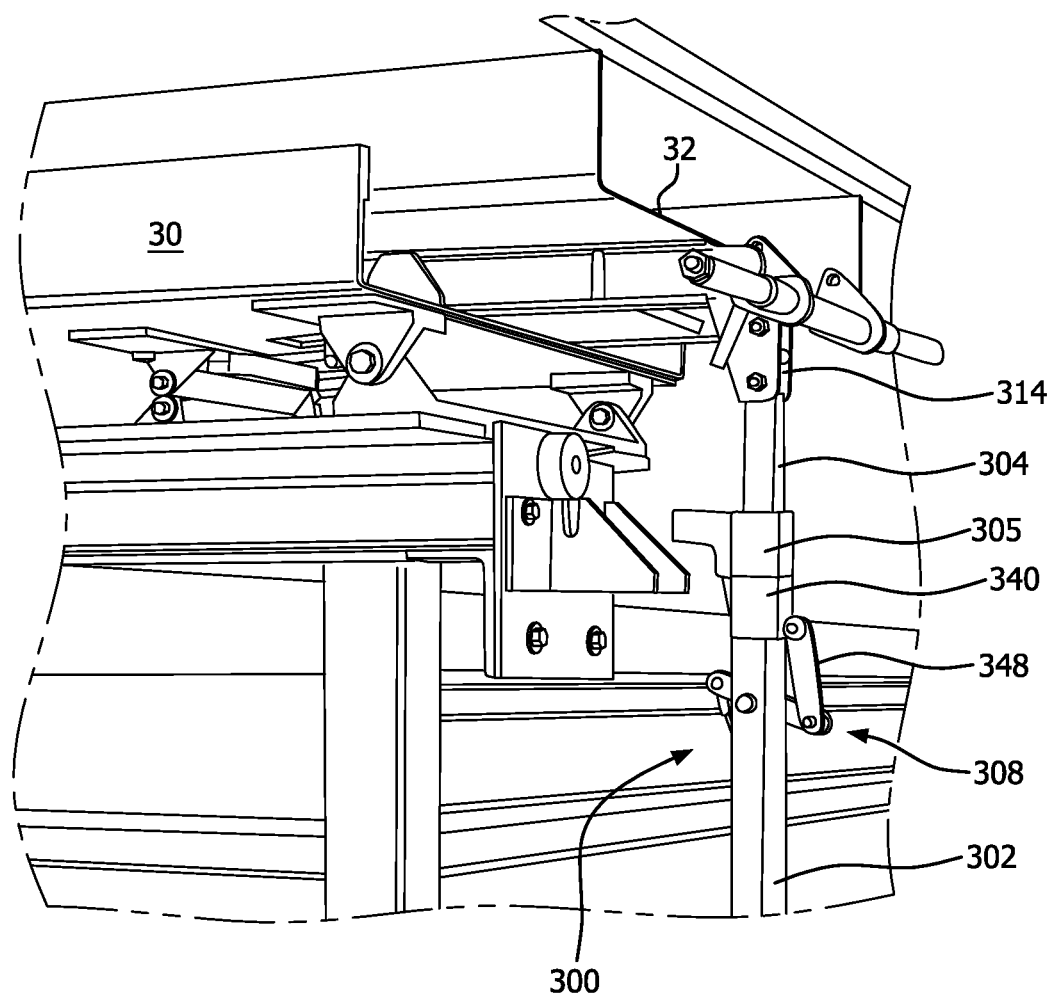
FIG. 15 is a left-side perspective view of a handle system installed on the system for storing and retrieving objects shown in FIGS. 1-14, depicting the carriage of the system in the forward position and a movable bracket of the handle system engaging a catch of the handle system.

The system 10 can include a handle catch 174, shown in FIGS. 1 and 14, to restrain the trolley 32 from rearward movement while the trolley 32 is in its stowed position. The handle catch 174 includes a bracket 176. The bracket 176 defines a receiving area 178 that receives, and partially encloses a portion of the handle 170 when the trolley 32 is in its forward-most position. The handle catch 174 also includes a pin 180 that is configured to extend across the receiving area 176 as shown in FIG. 14, so that interfering contact between the pin 180 and the handle 170 prevents rearward movement of the trolley 32 (and the attached ladder 12). Alternative embodiments of the system 10 can include features other than the handle catch 174 to restrain the trolley 32 from rearward movement.

FIGS. 15-23 depict an alternative embodiment of the second handle 170 in the form of a handle assembly 300. The handle assembly 300 includes a first, or lower arm 302; a second, or upper arm 304; a movable bracket 305; a catch 306; a release mechanism 308; and a mounting bracket 314.

The upper arm 304 has a tubular configuration, with a square cross section. The upper arm 304 can be solid, and can have a cross section other than square in alternative embodiments.

A first end of the upper arm 304 is securely connected to the mounting bracket 314 via bolts or other suitable means. The mounting bracket 314 is mounted on the trolley 32 as shown, for example, in FIG. 15, so that the mounting bracket 314 forms a secure connection between the handle system 300 and the trolley 32. A second end of the upper arm 304 is coupled to the lower arm 302 via a pin 315 or other means that permits the lower arm 302 to pivot in relation to the upper arm 304. The pin 315 is visible, for example, in FIGS. 18-21.

Figure 16:
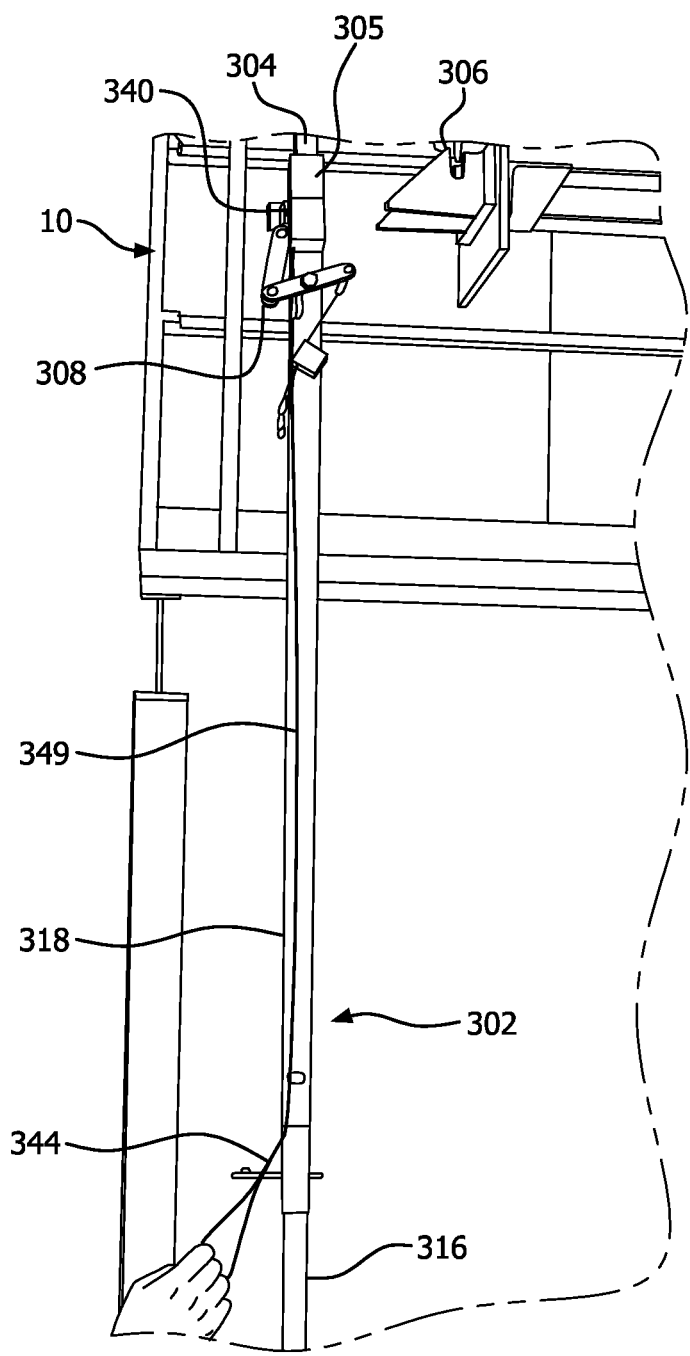
FIGS. 16 and 17 are right-side views of the handle system shown in FIG. 15, depicting the moving bracket disengaged from the catch.
Figure 17:
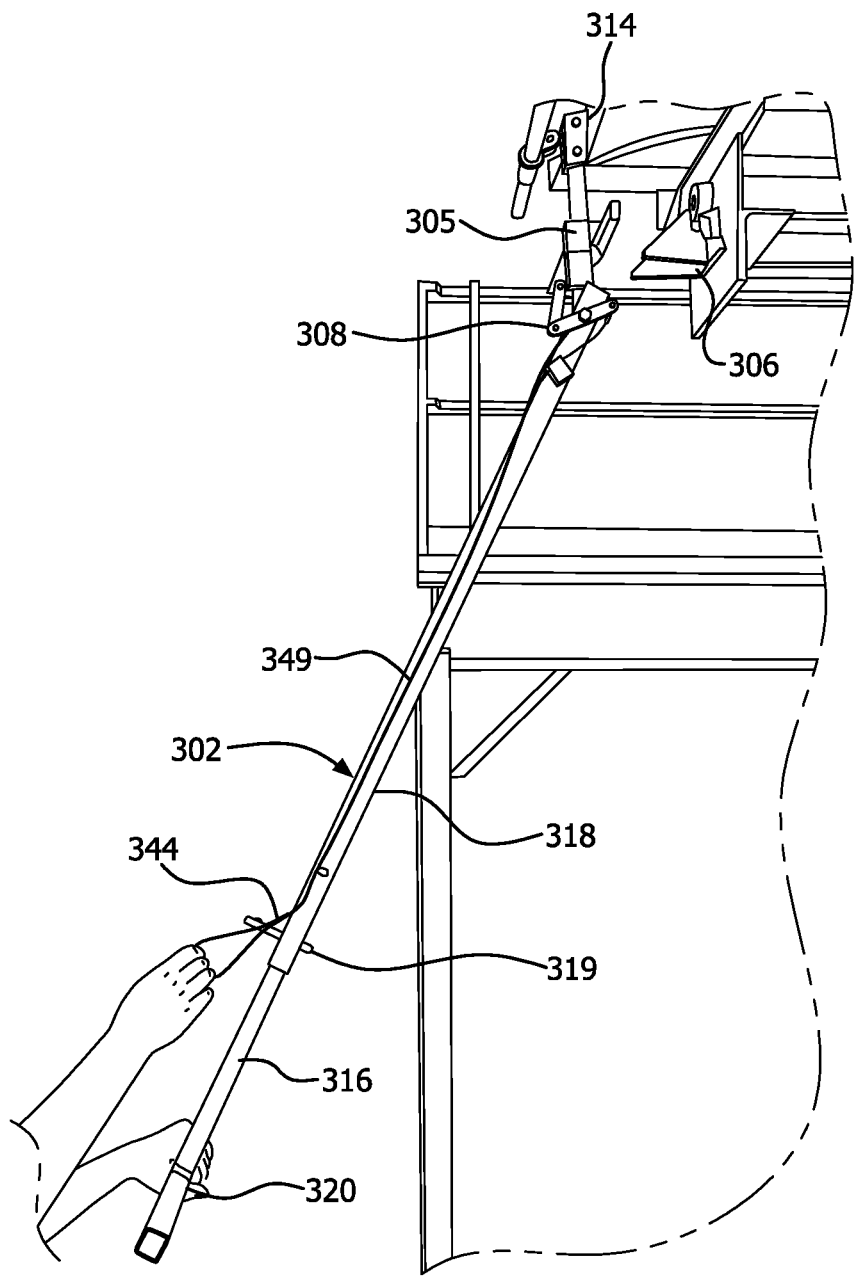
Figure 18:
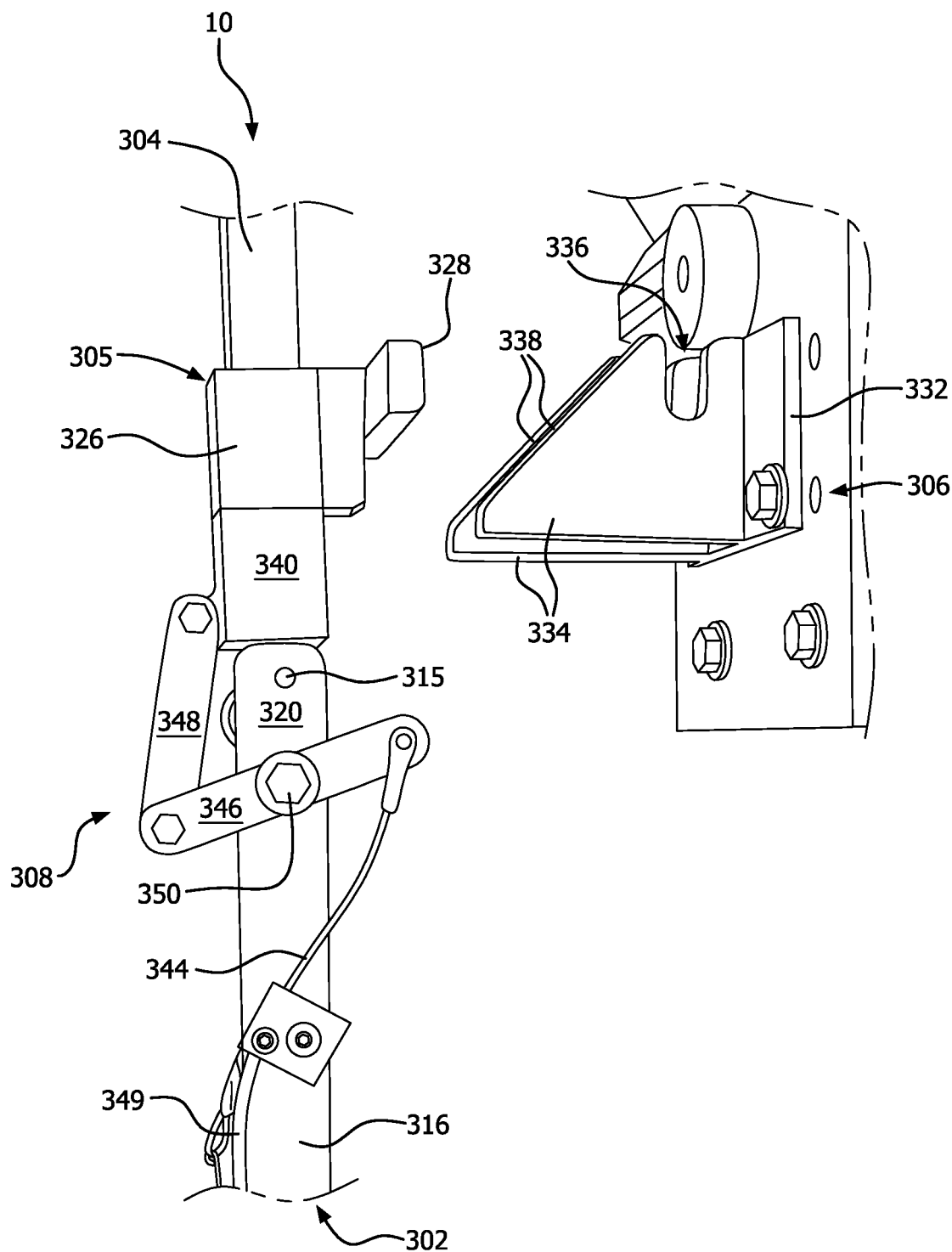
FIG. 18 is a magnified view of the area designated "A" in FIG. 17, depicting the moving bracket disengaged from the catch.

The lower arm 302 includes a first, or inner member 316 and a second, or outer member 318 as can be seen in FIGS. 16 and 17. Two hand grips 320 are connected to the lower end of the inner member 316, on opposite sides of the inner member 316.

The inner member 316 is disposed telescopically within the outer member 318. The inner member 316 and the outer member 318 each have a tubular configuration, with a square cross section. The inner member 316 can have a solid configuration, and the inner member 316 and the outer member 318 can have a cross section other than square in alternative embodiments. The inner member 316 and the outer member 318 are sized so that the inner member 316 can fit within the outer member 318 with minimal clearance between the inner member 316 and the outer member 318. The inner member 316 has a plurality of through holes (not shown) formed therein.

Through holes are formed on two opposing sides of the inner member 316; and are spaced apart along the lengthwise direction of the inner member 316 so that each through hole aligns with a corresponding through hole on the opposite side of the inner member 316. The outer member 318 has two opposing through holes formed on opposite sides thereof. The through holes in the inner member 316 and the outer member 318 allow the relative positions of the inner member 316 and the outer member 318 to be adjusted, which in turn facilitates adjustment of the overall length of the lower arm 302 by the user. In particular, the inner member 316 can be moved to a position in relation to the outer member 318 so as to locate the hand grips 320 on the inner member 316 at or near a desired position in relation to the user, and to cause a pair of opposing though holes in the inner member to align with the through holes in the outer member 318. A pin 319 can be inserted into the aligned through holes to secure the inner member 316 and the outer member 318 in the desired relative positions. The pin 319 is visible in FIG. 17.

The outer member 318 has two ears 321 that form the upper end of the lower arm 302. The ears 321 are visible, for example, in FIGS. 18-21. The ears 321 are spaced apart by a distance approximately equal to the width of the upper arm 304, so that the lower end of the upper arm 304 can fit between the ears 321 with minimal clearance. The ears 321 each have a through hole formed therein; and the lower end of the upper arm 304 has through holes formed therein that align with the through holes in the ears 321. The through holes in the ears 321 and the upper arm 304 receive the pin 315 that couples the upper arm 304 to the lower arm 302 and forms the pivot axis between the upper arm 304 and the lower arm 302. The pin 315 can be retained in the through holes by a key ring 317 or other suitable means. The key ring 317 is visible, for example, in FIGS. 20 and 21.

The catch 306 is securely mounted on a vertically-oriented surface of the fire engine 14 as can be seen, for example, in FIGS. 15 and 18-21. The movable bracket 305 is movable between an engaged, or locking position shown in FIGS. 19, 21, and 23; and a disengaged position shown in FIG. 21. The movable bracket 305 is configured to securely engage the catch 306 when the movable bracket 305 is in its locking position and the trolley 32 is in its forward position.

Figure 21:
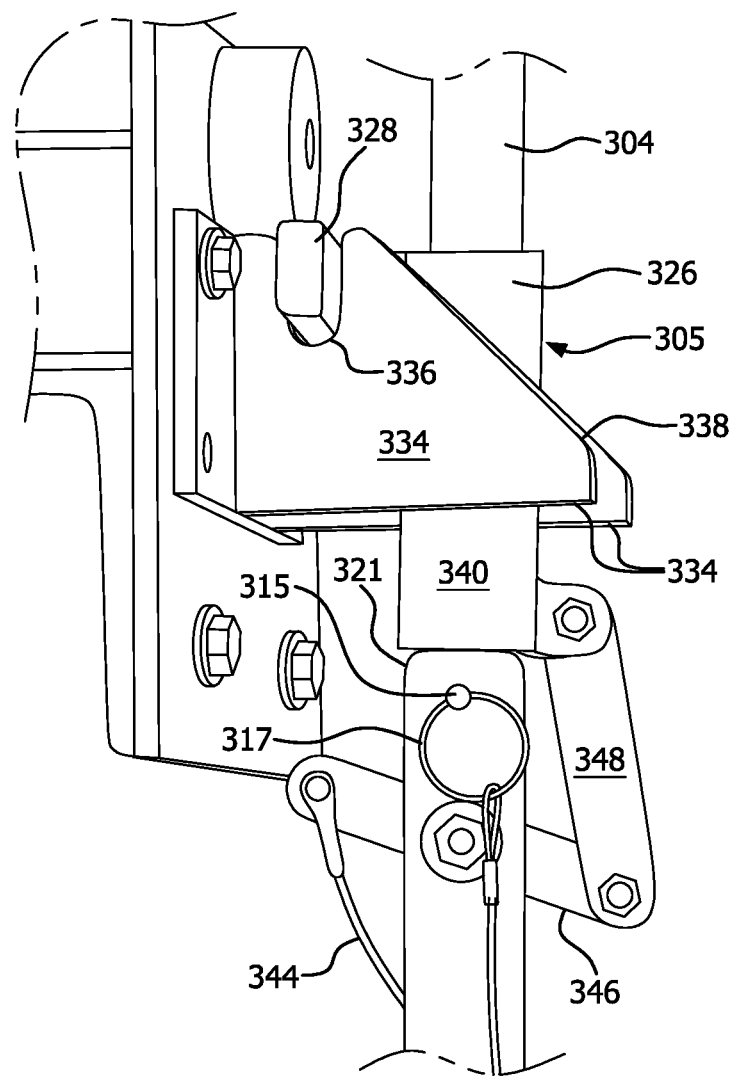
FIG. 21 is a left-side view of the portion of the handle system shown in FIGS. 18 and 19, depicting the moving bracket engaging the catch.
Figure 22:
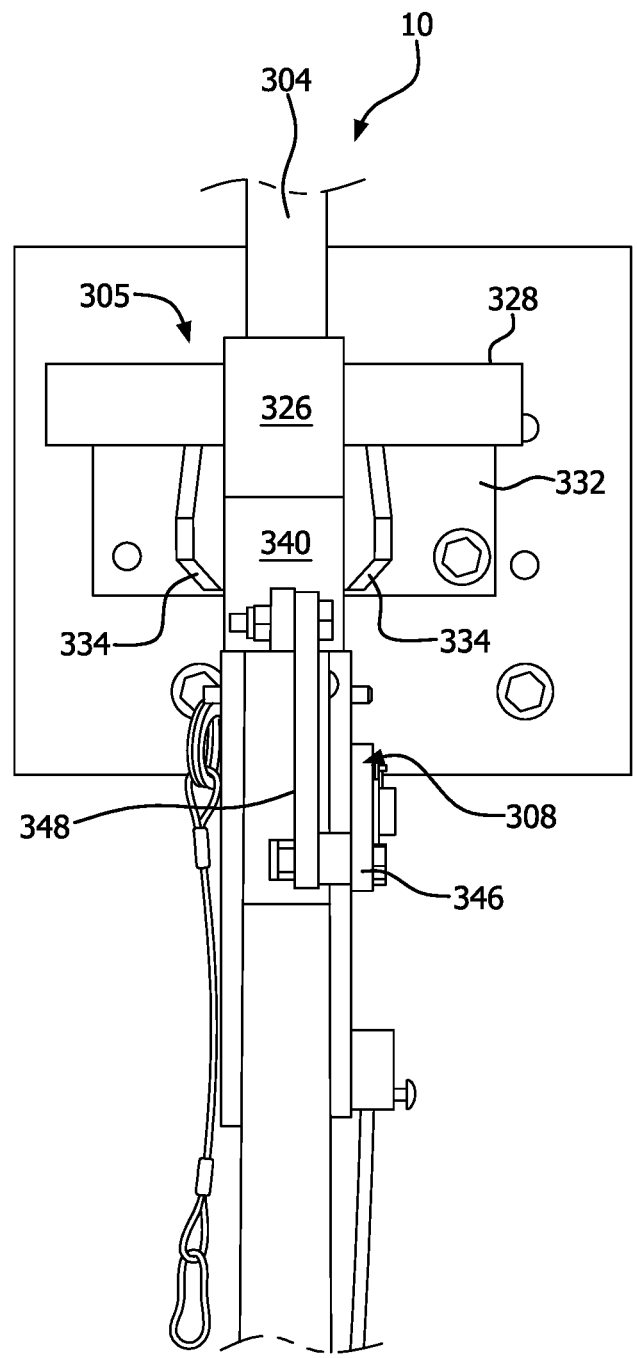
FIG. 22 is a front view of the portion of the handle system shown in FIGS. 18 and 19, depicting the moving bracket disengaged from the catch.
Figure 23:
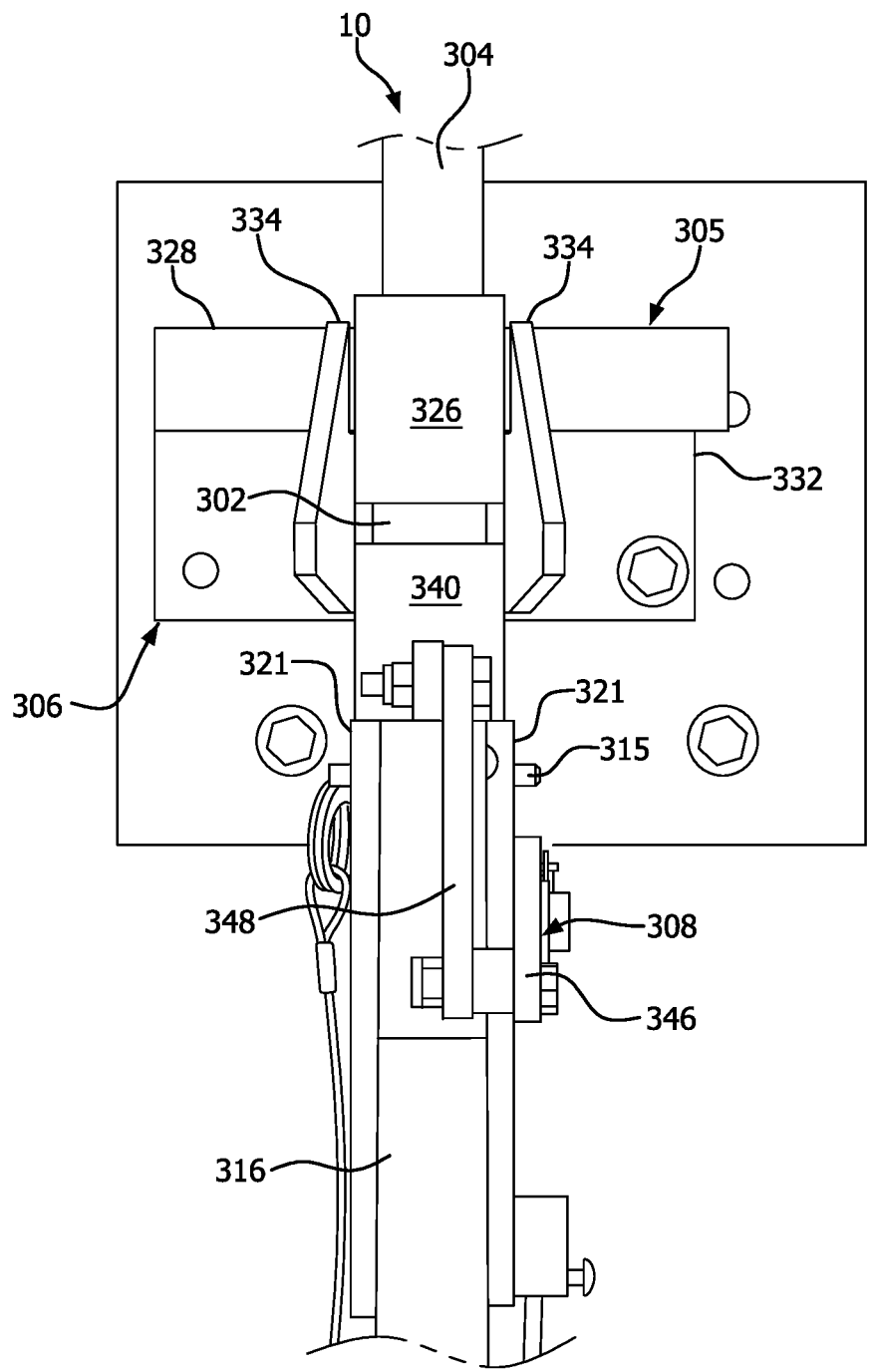
FIG. 23 is a front view of the portion of the handle system shown in FIGS. 18 and 19, depicting the moving bracket engaging the catch.

The movable bracket 305 is mounted on the upper arm 304 so that the movable bracket 305 can slide along the upper arm 304 as can be seen, for example, in FIGS. 18-23. The movable bracket 305 includes a body 326, and an elongated bar or cross member 328. The cross member 328 is securely connected to the body 326, and extends laterally in relation to the body 326 as shown in FIGS. 22 and 23. The body 326 and the cross member 328 can be formed separately and connected by a suitable means such as welding; the body 326 and the cross member 328 can be integrally formed in alternative embodiments. The cross member 328 has a rectangular cross section; the cross member 328 can have a cross section other than rectangular in alternative embodiments.

The body 326 defines an opening that receives the upper arm 304. The opening has a rectangular shape that approximately matches the shape of the upper arm 304. The opening is sized so that the upper arm 304 fits within the opening with minimal clearance, and the catch 306 can slide along the upper arm 304 as can be seen, for example, in FIGS. 18-23.

The catch 306 includes a base 332, and two ears 334 that adjoin, and extend outward from the base 332 as shown in FIGS. 18-21. The base 332 and the ears 334 can be formed separately and connected by a suitable means such as welding; the base 332 and the ears 334 can be integrally formed in alternative embodiments.

Figure 19:
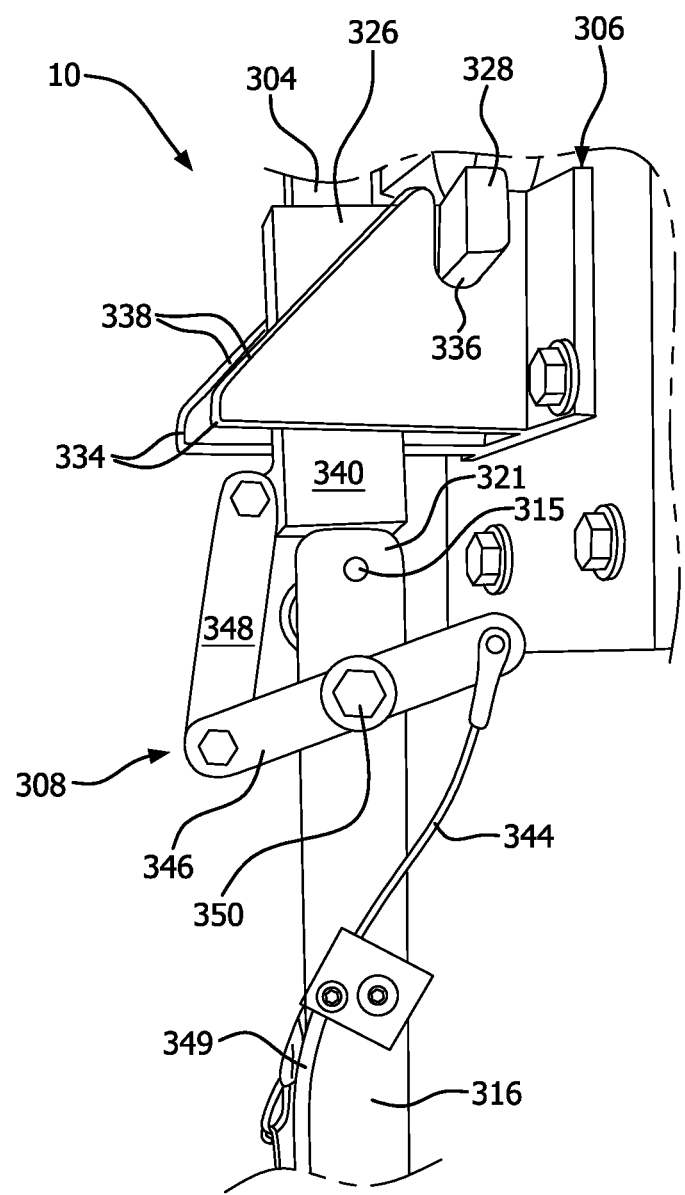
FIG. 19 is a magnified view of the area designated "A" in FIG. 17, depicting the moving bracket engaging the catch.
Figure 20:
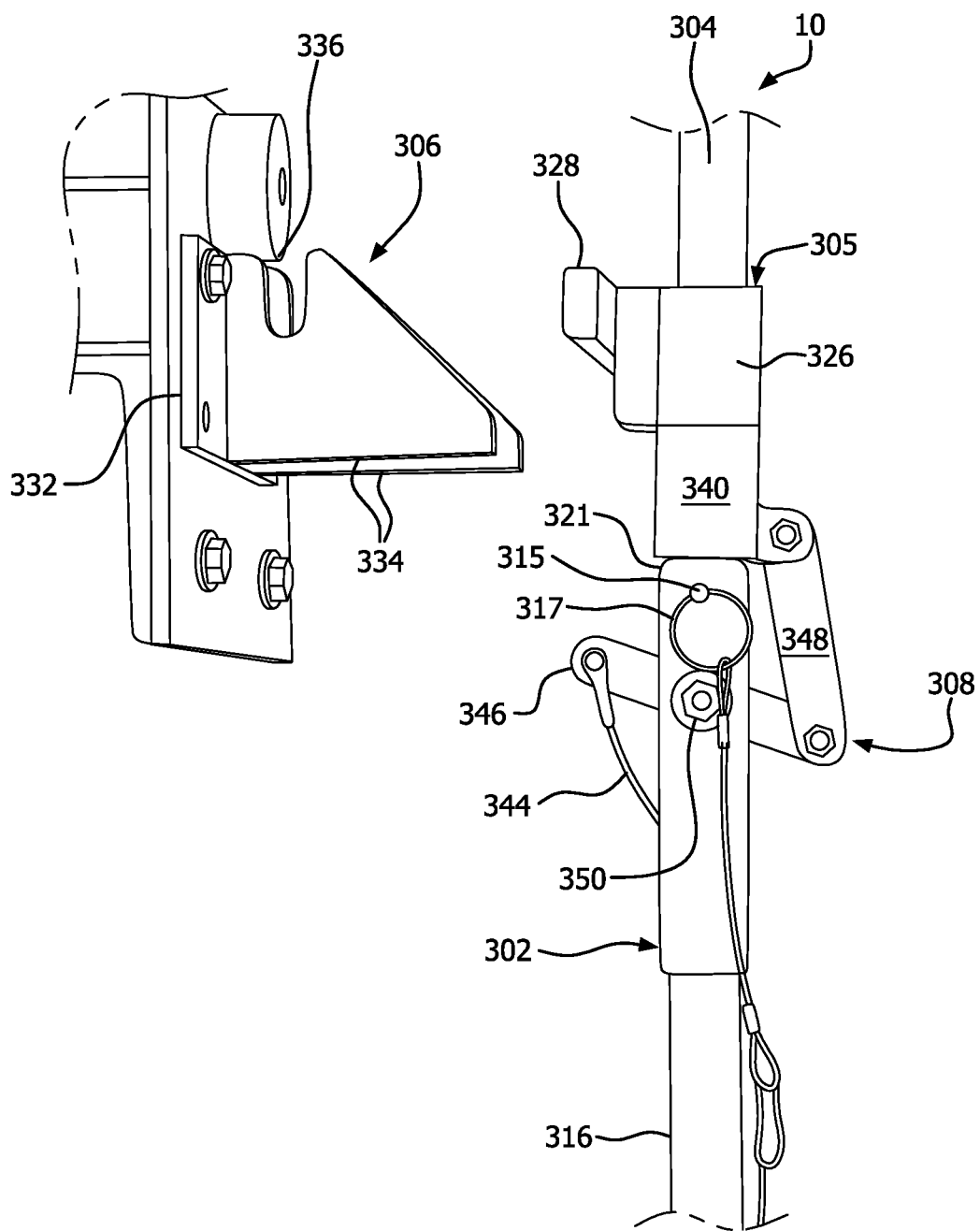
FIG. 20 is a left-side view of the portion of the handle system shown in FIGS. 18 and 19, depicting the moving bracket disengaged from the catch.

Each ear 334 has a slot 336 formed therein. Each slot 336 receives a portion of the cross member 328 when the trolley 32 is in its forward position. Each slot 336 has a width, or front-to-back dimension, that approximately matches the thickness of the cross member 328, so that the cross member 328 can fit within the slots 336 with minimal clearance as shown in FIGS. 19 and 21. Once the cross member 328 has become disposed within the slots 336, interference between the cross member 328 and the adjacent surfaces of the ears 334 prevents the cross member 328 from backing away from the fire engine 14, which in turn retains the trolley 32 in its stowed position.

The ears 334 each have a downwardly-angled forward surface 338. The forward surfaces 338 are disposed at angle of about 45 degrees in relation to the horizontal direction, from the perspective of FIGS. 18-21; the surfaces 338 can be disposed at other angles in alternative embodiments. The forward surfaces 338 help to guide the cross member 328 into the slots 336 as the trolley 32 is moved to its stowed position.

The release mechanism 308 is configured to move the movable bracket 305 from its locking position and to its disengaged position. In particular, the release mechanism 308 is configured to raise the cross member 328 out of the slots 336, so that the trolley 32 can be moved from its stowed position. The release mechanism comprises a sleeve 340, a linkage 342, and a cable 344 as can be seen, for example, in FIGS. 18-21. The sleeve 340 is positioned on the upper arm 304, between the body 326 of the movable bracket 305 and the lower end of the upper arm 304. The sleeve 340 defines an opening that receives the upper arm 304. The opening has a rectangular shape that approximately matches the shape of the upper arm 304. The opening is sized so that the upper arm 304 fits within the opening with minimal clearance, so that the sleeve 340 can slide along the upper arm 304. The sleeve 340 can be integrally formed with the movable bracket 305 in alternative embodiments.

The linkage 342 includes a first bar 346 and a second bar 348. The first bar 346 is coupled to the lower arm 302 proximate the upper end of the lower arm 302, as shown in FIGS. 18-21. The first bar 346 is coupled to the lower arm 302 by a fastener 350 or other suitable means that permits the first bar 346 to rotate in relation to the lower arm 302. The first bar 346 is coupled to the lower arm 302 at the approximate mid-point of the first bar 346.

A first end of the first bar 346 is coupled to a first end of the second bar 348 by a fastener or other suitable means that permits the second bar 348 to pivot in relation to the first bar 346. A first, or upper end of the cable 344 is attached to a second end of the first bar 346. A second end of the second bar 348 is coupled to the sleeve 340 by a fastener or other suitable means that permits the second bar 348 to pivot in relation to the sleeve 340.

The cable 344 is disposed within a sheath 349. The cable 344 and the sheath 349 extend along the exterior of the lower arm 302, so that a second, or lower end of the cable 344 is located near the lower end of the outer member 318 of the lower arm 302, as can be seen in FIGS. 16 and 17. The cable 344 and the sheath 349 can be secured to the lower arm 302 by brackets or other suitable means that engage the sheath 349. A second, or lower end of the cable 344 has a loop formed therein, to assist the user in grasping and pulling the cable.

The movable bracket 305 normally remains in its locking position due to the weight of the catch 306. In alternative embodiments, the handle assembly 300 can be equipped with a spring or other means for biasing the movable bracket 305 toward its locking position. The user can move the movable bracket 305 from its locking position to disengaged position by pulling the cable 344. The resulting tension in the cable 344 causes the first bar 346 of the release mechanism 308 to rotate about the fastener 350 in a clockwise direction, from the perspective of FIGS. 18 and 19. The rotation of the first bar 346 causes the second bar 348 to move upward. The upward movement of the second bar 348 imparts a corresponding movement to the sleeve 340, causing the sleeve 340 to slide upward along the upper arm 304, as can be seen in FIGS. 22 and 23. The upward movement of the sleeve 340, in turn, urges the movable bracket 305 upward so that the movable arm 305 slides along the upper arm 304 toward its disengaged position. The upward movement of the movable arm 305 eventually causes the cross member 328 to rise out of the slots 336 in the catch 306. As shown in FIG. 22, when the movable bracket 305 reaches its disengaged, or uppermost, position, the cross member 328 has moved completely out of the slots 336 and no longer interferes with rearward movement of the movable bracket 305 and the trolley 32.

At this point, the user can pull the lower arm 302 rearward using the hand grips 320, while maintaining tension in the cable 344, causing the cross member 328 to moved rearward. Once the cross member 328 has moved out of alignment with the slots 336, the user can release the cable 344, allowing the sleeve 340 and the catch 306 to slide downward along the upper arm 304 under their own weight.

As can be seen in FIG. 17, the lower arm 302 can pivot in relation to the upper arm 304, so that the hand grips 320 can swing to a height comfortable to the user, as the user walks the lower arm 302 rearward. The rearward force exerted by the user on the lower arm 302 via the hand grips 320 is transmitted to the trolley 32 by way of the pin 315; the upper arm 304; and mounting bracket 314. The trolley 32 thus moves rearward, from its forward position and toward its rearwardly-extended position, as the user walks the lower arm 302 rearward, until the trolley 32 eventually reaches its rearwardly-extended position.

As also can be seen in FIG. 17, the user can actuate the release mechanism 308 and thereby release the trolley 32 from its stowed forward position after the lower arm 302 has been pivoted into a desired angular position by the user. The ability to release the trolley 32 in this manner results from the use of the flexible cable 344 in conjunction with the release mechanism 308, which is configured to convert the tension in the cable 344 into vertical movement of the sleeve 340 that in turn causes the movable bracket 305 to move vertically and disengage from the catch 306. Thus, the user can release the trolley 32 without any need to bend, stoop, or kneel, and with the cable 344 located at an optimum position and orientation in relation to the user.

The user can return the trolley 32 to its forward position by grasping the hand grips 320 and rotating the lower arm 302 to an angular position comfortable for the user. The user can exert a force on the lower arm 302 in the forward and upward directions while walking the lower arm 302 forward. The force is transmitted to the trolley 32 in the above-described manner, and causes the trolley 32 to move forward and retract toward its forward position.

As the trolley 32 nears the forward position, the cross member 328 contacts the forward surfaces 338 of the ears 334. The angled orientation of the forward surfaces 338 causes the cross member 328 to ride up the forward surfaces 338 as the user continues to walk the lower arm 320 forward. The cross member 328 eventually becomes aligned with the slots 336 as the trolley 32 reaches its forward position, at which point the cross member 328 drops into the slots 336 under the weight of the catch 306, thereby securing the trolley 32 in its forward position as discussed above. The lower arm 302 can be secured from pivoting in relation to the upper arm 304 by a strap or other suitable means (not shown) once the trolley 32 has been stowed in its forward position, to prevent unintended swinging movement of the lower arm 302 due to factors such as acceleration and deceleration of the fire engine 14.

The handle system 300 automatically secures the trolley 32 when the trolley 32 is moved to its forward position, with no action required on the part of the user other than moving the trolley 32 to the forward position as described above. The user can quickly and easily release the trolley 32 from its forward position by pulling on the cable 344, which as noted above can be located at an optimum position and orientation for the user as a result of the pivoting motion of the lower arm 302. Also, the user can release the trolley 32 and move the trolley 32 between its forward and rearwardly-extended positions without leaving the ground, i.e., without a need to climb on the fire engine 14, and without the need for a ladder or stool; and without the use of any tooling or other equipment that is not an integral part of the handle system 300. Also, the ability of the lower arm 302 to pivot in relation to the upper arm 304 permits the user to move the lower arm 302 to an optimum position for that particular user. These features can be particularly advantageous when the ladder 12 needs to be retrieved in emergency situations such as firefighting and rescue operations, and under the low-visibility and inclement weather conditions under which such operations often are performed.

The handle system 300 has been described in connection with the system 10 for illustrative purposes only; the handle system 300 can be used in other applications in which a movable platform for a ladder or other object needs to be secured and released.

The system 10 thus can facilitate the storage and retrieval of objects such as ladders in spaces where it otherwise may not be feasible to store such objects. It is believed that the automatic locking and unlocking features of the system 10 can enhance the safety and speed with which ladders and other objects can be retrieved from, and returned to storage areas such as the roof of an emergency vehicle, where physical and visual access may be limited. Also, while the use of the system 10 is not limited to firefighting and other emergency operations, it is believed that the use of the system 10 can be particularly beneficial during such operations, where time is of the essence and which often take place in adverse weather and lighting conditions.

Alternative embodiments of the system 10 can be configured without the first locking mechanism 82 or the second locking mechanism 130, and without a movable trolley. Also, alternative embodiments can be equipped with motorized features for causing the tray 34 to pivot, or for causing the trolley 32 to move between its forward and rearwardly-extended positions.

PARTS LIST system 10
ladder 12
fire engine 14
forward end 14a
back end 14b
exterior surface 18
carriage 30
trolley 32
table 34
bottom portion 35
sides 36
rails 40
brackets 42
cross members 44
wheel assemblies 50
brackets 52
wheels 54
channel 60
forward stop 68
mount 70
stationary brackets 72
pivoting brackets 74
base 76
first mounting plate 78
first locking mechanism 82
upper bracket 84
lower bracket 86
second mounting plate 88
linkage 90
upper member 92
lower member 94
arms 95
web 96
two arms 97 web 98
lower pin 99
upper pin 100
locking pin 101
spring 102
release 106
arm 108
slide 114
upper member 115
brackets 116
arms 117
opening 118
pin 119
slot 120
actuator 121
movable bracket 122
end 112a
stationary bracket 123
end 123a
springs 124
cable 125
handle 126
brackets 127
stops 128
pins 129
second locking mechanism 130
latch 132
bracket 134
spring 136
pin 138
catch 140
first portion 142
recess 143
opening 144
a tongue 146
bracket assembly 148
pin 150
spring 152
hook portions 156
web 158
upper surface 166
handle 170
handle catch 174
bracket 176
receiving area 178
pin 180
dampener 190
bracket 192
centering mechanism 196
plug 198
receptacle 200
tangs 202
sides 204
brackets 206
handle assembly 300
lower arm 302
upper arm 304
movable bracket 305
catch 306 release mechanism 308
mounting bracket 314
pin 315
inner member 316
outer member 318
pin 319
key rings 317
hand grips 320
ears 321
body 326
cross member 328
base 332
ears 334
slots 336
forward surfaces 338
sleeve 340
linkage 342
cable 344
first bar 346
second bar 348
fastener 350
sheath 349

What is claimed is:

1. A system for storing and retrieving an object, comprising:
a carriage configured for mounting on a mounting surface of a vehicle or structure;
a trolley mounted on the carriage, the trolley being configured to hold the object, and to move linearly between a first and a second position in relation to the carriage; and
a handle system comprising: a catch configured for mounting on the vehicle or structure; a first arm comprising a first member and a second member, the first member being disposed telescopically within the second member; a second arm secured to the trolley and coupled to the first arm so that the first arm is pivotable in relation to the second arm; and a bracket mounted on the second arm and configured to move in relation to the second arm between a first position at which a portion of the bracket engages the catch when the trolley is in the first position of the trolley; and a second position at which the portion of the bracket is disengaged from the catch.

2. The system of claim 1, wherein the catch is configured to restrain the bracket and the second arm and thereby prevent the trolley from moving from the first to the second position of the trolley when the bracket engages the catch.

3. The system of claim 1, wherein the carriage comprises a table configured to rotate between a first and a second angular position in relation to the mounting surface.

4. The system of claim 1, wherein the first arm is pivotally coupled to the second arm by a pin.

5. The system of claim 1, wherein the bracket comprises a sleeve configured to slide over the second arm, and a cross member attached to the sleeve, the cross member being configured to engage the catch when the bracket is in the first position of the bracket and the trolley is in the first position of the trolley.

6. The system of claim 5, wherein the cross member is further configured to disengage from the catch when the bracket is moved from the first to the second position of the bracket and the trolley is in the first position of the trolley.

7. The system of claim 5, wherein the catch comprises a base, and at least one ear that extends outward from the base and has a least one slot formed therein, the slot being configured to receive a portion of the cross member when the bracket is in the first position of the bracket and the trolley is in the first position of the trolley.

8. The system of claim 7, wherein the ear has an edge oriented at an oblique angle in relation to a lengthwise direction of the slot; and the ear is configured so that the edge contacts the cross member and guides the cross member to an entrance to the slot when the trolley moves to the second position of the trolley.

9. The system of claim 7, further comprising a mounting bracket connected to the second arm and the trolley.

10. The system of claim 7, wherein the ear is a first ear and the catch further comprises a second ear.

11. The system of claim 1, wherein the handle system further comprises a release mechanism comprising:
a sleeve positioned on the second arm and configured to move between a first and a second position in relation to the second arm, movement of the sleeve from the first to the second position of the sleeve causing the bracket to move from the first to the second position of the bracket; and
a linkage coupled to the first arm and the sleeve and configured to move the sleeve from the first to the second position of the sleeve.

12. The system of claim 11, wherein:
the catch has a slot formed therein and configured to receive the portion of the bracket when the bracket is in the first position of the bracket and the trolley is in the first position of the trolley; and
the release mechanism is configured to raise the portion of the bracket from the slot.

13. The system of claim 11, wherein:
the linkage comprises a first bar coupled to the first arm so that the first bar can rotate in relation to the first arm; and a second bar coupled to the first arm and the sleeve so that the second bar is pivotable in relation to the first arm and the sleeve; and
the linkage is configured so that rotation of the first bar in a first direction causes the second bar to move the sleeve from the first to the second position of the sleeve.

14. The system of claim 13, wherein the release mechanism further comprises a cable connected to the first bar and configured to exert a force on the first bar that causes the first bar to rotate in the first direction.

15. The system of claim 14, wherein the cable extends along an exterior of the first arm over a substantial entirety of a length of the first arm.

16. The system of claim 11, wherein the sleeve of the release mechanism and the bracket are configured so slide along the second arm.

17. The system of claim 11, wherein the sleeve of the release mechanism is configured to contact the bracket and urge the bracket from the first to the second position of the bracket when the sleeve moves from the first to the second position of the sleeve.

18. The system of claim 1, wherein the catch has at least one slot formed therein, the slot being configured to receive the portion of the bracket when the bracket is in the first position of the bracket and the trolley is in the first position of the trolley.

19. The system of claim 1, further comprising hand grips mounted on and extending from opposite sides of the lower arm.

20. A system for storing and retrieving an object, comprising:
a carriage configured for mounting on a mounting surface of a vehicle or structure;

a trolley mounted on the carriage, the trolley being configured to hold the object, and to move linearly between a first and a second position in relation to the carriage; and a handle system comprising: a catch configured for mounting on the vehicle or structure; a first arm; a second arm secured to the trolley and coupled to the first arm so that the first arm is pivotable in relation to the second arm; and a bracket mounted on the second arm and configured to move in relation to the second arm between a first position at which a portion of the bracket engages the catch when the trolley is in the first position of the trolley; and a second position at which the portion of the bracket is disengaged from the catch;

wherein the bracket comprises a sleeve configured to slide over the second arm, and a cross member attached to the sleeve, the cross member being configured to engage the catch when the bracket is in the first position of the bracket and the trolley is in the first position of the trolley.

21. A system for storing and retrieving an object, comprising:
a carriage configured for mounting on a mounting surface of a vehicle or structure;
a trolley mounted on the carriage, the trolley being configured to hold the object, and to move linearly between a first and a second position in relation to the carriage; and
a handle system comprising:
a catch configured for mounting on the vehicle or structure;
a first arm;
a second arm secured to the trolley and coupled to the first arm so that the first arm is pivotable in relation to the second arm;
a bracket mounted on the second arm and configured to move in relation to the second arm between a first position at which a portion of the bracket engages the catch when the trolley is in the first position of the trolley, and a second position at which the portion of the bracket is disengaged from the catch;
a sleeve positioned on the second arm and configured to move between a first and a second position in relation to the second arm, movement of the sleeve from the first to the second position of the sleeve causing the bracket to move from the first to the second position of the bracket; and
a linkage coupled to the first arm and the sleeve and configured to move the sleeve from the first to the second position of the sleeve.

22. A system for storing and retrieving an object, comprising:
a carriage configured for mounting on a mounting surface of a vehicle or structure;
a trolley mounted on the carriage, the trolley being configured to hold the object, and to move linearly between a first and a second position in relation to the carriage; and
a handle system comprising: a catch configured for mounting on the vehicle or structure; a first arm; a second arm secured to the trolley and coupled to the first arm so that the first arm is pivotable in relation to the second arm; and a bracket mounted on the second arm and configured to move in relation to the second arm between a first position at which a portion of the bracket engages the catch when the trolley is in the first position of the trolley; and a second position at which the portion of the bracket is disengaged from the catch;
wherein the catch has at least one slot formed therein, the slot being configured to receive the portion of the bracket when the bracket is in the first position of the bracket and the trolley is in the first position of the trolley.

23. A system for storing and retrieving an object, comprising:
a carriage configured for mounting on a mounting surface of a vehicle or structure;
a trolley mounted on the carriage, the trolley being configured to hold the object, and to move linearly between a first and a second position in relation to the carriage;
a handle system comprising: a catch configured for mounting on the vehicle or structure; a first arm; a second arm secured to the trolley and coupled to the first arm so that the first arm is pivotable in relation to the second arm; and a bracket mounted on the second arm and configured to move in relation to the second arm between a first position at which a portion of the bracket engages the catch when the trolley is in the first position of the trolley; and a second position at which the portion of the bracket is disengaged from the catch; and
hand grips mounted on and extending from opposite sides of the lower arm.

* * * * *